United States Patent
Fijolek et al.

(10) Patent No.: US 6,553,568 B1
(45) Date of Patent: Apr. 22, 2003

(54) METHODS AND SYSTEMS FOR SERVICE LEVEL AGREEMENT ENFORCEMENT ON A DATA-OVER CABLE SYSTEM

(75) Inventors: John G. Fijolek, Naperville, IL (US); Phillip T. Robinson, Lake Barrington, IL (US); Irene M. Gilbert, Palatine, IL (US); Daniel M. Budinger, Arlington Heights, IL (US); Narij Jain, San Jose, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/407,337

(22) Filed: Sep. 29, 1999

(51) Int. Cl.[7] .......................... H04N 7/173; G06F 15/16
(52) U.S. Cl. ........................ 725/111; 725/100; 725/86; 709/218
(58) Field of Search ............................ 725/86, 95, 100, 725/111; 709/218

(56) References Cited

U.S. PATENT DOCUMENTS

| | | | |
|---|---|---|---|
| 4,881,263 A | 11/1989 | Herbison et al. ............... | 380/21 |
| 4,996,685 A | 2/1991 | Farese et al. ................ | 370/58.1 |
| 5,014,234 A | 5/1991 | Edwards, Jr. ................ | 364/900 |
| 5,138,712 A | 8/1992 | Corbin | |
| 5,301,273 A | 4/1994 | Konishi ........................ | 395/200 |
| 5,347,304 A | 9/1994 | Moura et al. ................. | 348/12 |
| 5,430,727 A | 7/1995 | Callon ....................... | 370/85.13 |
| 5,442,749 A | 8/1995 | Northcutt et al. | |
| 5,488,412 A | 1/1996 | Majeti et al. ................. | 348/10 |
| 5,489,897 A | 2/1996 | Inoue ...................... | 340/870.39 |
| 5,583,931 A | 12/1996 | Schneider et al. .......... | 379/399 |
| 5,586,121 A | 12/1996 | Moura et al. ................ | 370/404 |
| 5,600,717 A | 2/1997 | Schneider et al. .......... | 379/399 |
| 5,606,606 A | 2/1997 | Schneider et al. .......... | 379/399 |
| 5,608,446 A | 3/1997 | Carr et al. ...................... | 348/6 |

(List continued on next page.)

OTHER PUBLICATIONS

"Cable Modem to Customer Premise Equipment Interface Specification (Interim) SP–CMCl–l02–980317", Multimedia Cable Network Systems (MCNS) Holdings, L.P., Cable Television Laboratories, Inc., 1998, pp. ii to 40.

(List continued on next page.)

Primary Examiner—Krisna Lim
(74) Attorney, Agent, or Firm—McDonnell Boehnen Hulbert & Berghoff

(57) ABSTRACT

Methods and system for service level agreement enforcement on a data-over-cable system. One or more service level agreements are created including one or more class-of-service or quality-of-service parameters. A pool of Internet Protocol addresses is allocated for the one or more service level agreements. Configuration files including service level agreement parameters are used to initialize cable modems or customer premise equipment. When a cable modem or customer premise equipment requests use of a service level agreement, an Internet Protocol address from the pool of Internet Addresses associated with a desired service level agreement is assigned. The service level agreements are enforced using the Internet Protocol address from a cable modem termination system including an integral switch cable access router and a bandwidth manager. The cable modem termination system with integral components are duplicated to provide a "hot back" up in case of failure and increase reliability for using service level agreements. The cable access router enforces maximum rate limits for service level agreements. The switch switches data streams from external networks from the data-over-cable system. The bandwidth manager provides class-of-service or quality-of-service services with policy management and detects network trends, measures network response time and generates reports. The bandwidth manager also monitors, regulates and shapes traffic based on service level agreement requests at a data-link layer level. The methods and system allow service level agreements to be used on a data-over-cable system without adversely affecting performance or throughput on the data-over-cable system. The methods and system may also help provide service level agreements in a data-over-cable system in a more reliable manner.

6 Claims, 10 Drawing Sheets

U.S. PATENT DOCUMENTS

| | | | |
|---|---|---|---|
| 5,610,910 A | 3/1997 | Focsaneanu et al. | 370/351 |
| 5,623,542 A | 4/1997 | Schneider et al. | 379/399 |
| 5,623,601 A | 4/1997 | Vu | |
| 5,636,211 A | 6/1997 | Newlin | 370/465 |
| 5,675,732 A | 10/1997 | Majeti et al. | |
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | |
| 5,724,510 A | 3/1998 | Arndt et al. | |
| 5,761,602 A | 6/1998 | Wagner et al. | 455/3.1 |
| 5,778,181 A | 7/1998 | Hidary et al. | |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | |
| 5,790,806 A | 8/1998 | Koperda | |
| 5,793,747 A | 8/1998 | Kline | 370/230 |
| 5,799,086 A | 8/1998 | Sudia | 380/23 |
| 5,805,804 A | 9/1998 | Laursen et al. | |
| 5,812,819 A | 9/1998 | Rodwin et al. | 395/500 |
| 5,818,845 A | 10/1998 | Moura et al. | 370/449 |
| 5,819,042 A | 10/1998 | Hansen | |
| 5,828,655 A | 10/1998 | Moura et al. | 370/236 |
| 5,828,666 A | 10/1998 | Foscaneanu et al. | 370/389 |
| 5,835,727 A | 11/1998 | Wong et al. | |
| 5,848,233 A | 12/1998 | Radia et al. | 395/187.01 |
| 5,852,721 A | 12/1998 | Dillon et al. | |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | |
| 5,892,754 A | 4/1999 | Kompella et al. | 370/236 |
| 5,894,479 A | 4/1999 | Mohammed | 370/401 |
| 5,909,549 A | 6/1999 | Compliment et al. | 709/223 |
| 5,915,119 A | 6/1999 | Cone | |
| 5,922,049 A | 7/1999 | Radia et al. | 709/220 |
| 5,923,659 A | 7/1999 | Curry et al. | 370/401 |
| 5,926,458 A | 7/1999 | Yin | 370/230 |
| 5,958,007 A | 9/1999 | Lee et al. | 709/219 |
| 5,974,453 A | 10/1999 | Anderson et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,018,767 A | 1/2000 | Fijolek et al. | 709/218 |
| 6,031,841 A | 2/2000 | Woundy | 370/410 |
| 6,046,979 A | 4/2000 | Bauman | 370/229 |
| 6,049,825 A | 4/2000 | Yamamoto | 709/221 |
| 6,049,826 A | 4/2000 | Beser | 709/222 |
| 6,058,421 A | 5/2000 | Fijolek et al. | 709/225 |
| 6,061,349 A | 5/2000 | Coile et al. | 370/389 |
| 6,070,187 A | 5/2000 | Subramaniam et al. | 709/220 |
| 6,070,246 A | 5/2000 | Beser | 713/201 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,178,455 B1 | 1/2001 | Schutte et al. | 709/228 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar | 370/486 |
| 6,275,853 B1 | 8/2001 | Beser et al. | 709/223 |
| 6,295,554 B1 | 9/2001 | Karadogan | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |

OTHER PUBLICATIONS

"Operations Support System Interface Specification Baseline Privacy Interface MIB (Interim Specification) SP–OS-Sl–BPl–l01–980331", MCNS Holdings, L.P., 1997 and 1998, pp. ii to 33.

"Cable Modem Termination System–Network Side Interface Specification (Interim Specification) SP–C-MTS–NSll101–960702", MCNS Holdings, L.P., 1996, pp. ii to 13.

"Removable Security Module Interface Specification (Interim Specification) SP–RSM1–l01–980204", MCNS Holdings, L.P., Cable Television Laboratories, Inc., 1997, pp. ii to 47.

"Baseline Privacy Interface Specification (Interim) SP–B-Pl–l01–970922", MCNS Holdings, L.P., 1997, pp. ii to 65.

"Operations Support System Interface Specification (Interim) SP–OSSll01–970403", MCNS Holdings, L.P., 1997, pp. 1 to 30.

"Radio Frequency Interface Specification (Interim Specification) SP–RFl–I02–971008", MCNS Holdings, L.P., 1997, pp. ii to 186.

"Cable Modem Telephony Return Interface Specification (Interim) SP–CMTRl–l01–970804", MCNS Holdings, L.P., Cable Television Laboratories, Inc., 1997, pp. ii to 73.

"Security System Specification (Interim Specification) SP–SSl–l01–970506", MCNS Holdings, L.P., 1997, pp. ii to 103.

"Internet Engineering Task Force", Request for Comments 2131, Dynamic Host Configuration Protocol (DHCP), Mar. 1997, pp. 1 to 42.

S. Adiraju, J. Fijolek, IPCDN Telephony Return MIP, Internet Engineering Task Force, Internet Draft, "<draft–ietf–ipcdn–tri–mib–00.1.txt>," Mar. 1998, pp. 1 to 26.

"Radio Frequency Interface (Interim Specification) SP–RFI–I04–980724", MCNS Holdings, L.P., 1997, pp. ii to 196.

"Radio Frequency Interface Specification (Interim Specification) SP–RFI–I05–991105", MCNS Holdings, L.P., 1999, pp. ii to 202.

"Radio Frequency Interface Specification (Interim Specification) SP–RFIv1.l–I06–001215", MCNS Holdings, L.P., 2000, pp. ii to 432.

Kyees, P.J. et al., *ADSL: A New Twisted–Pair Access to the Information Highway*, IEEE Communications Magazine, vol. 33, Issue 4, Apr. 1995, pp. 52–60.

Huang, Yin–Hwa et al., *Design of an MPEG–Based Set–Top Box for Video on Demand Services*, Acoustics, Speech, and Signal Processing, 1995, ICASSP–95., 1995 International Conference, vol. 4, ISBN: 0–7803–2431–5, May 9–12, 1995, pp. 2655–2658.

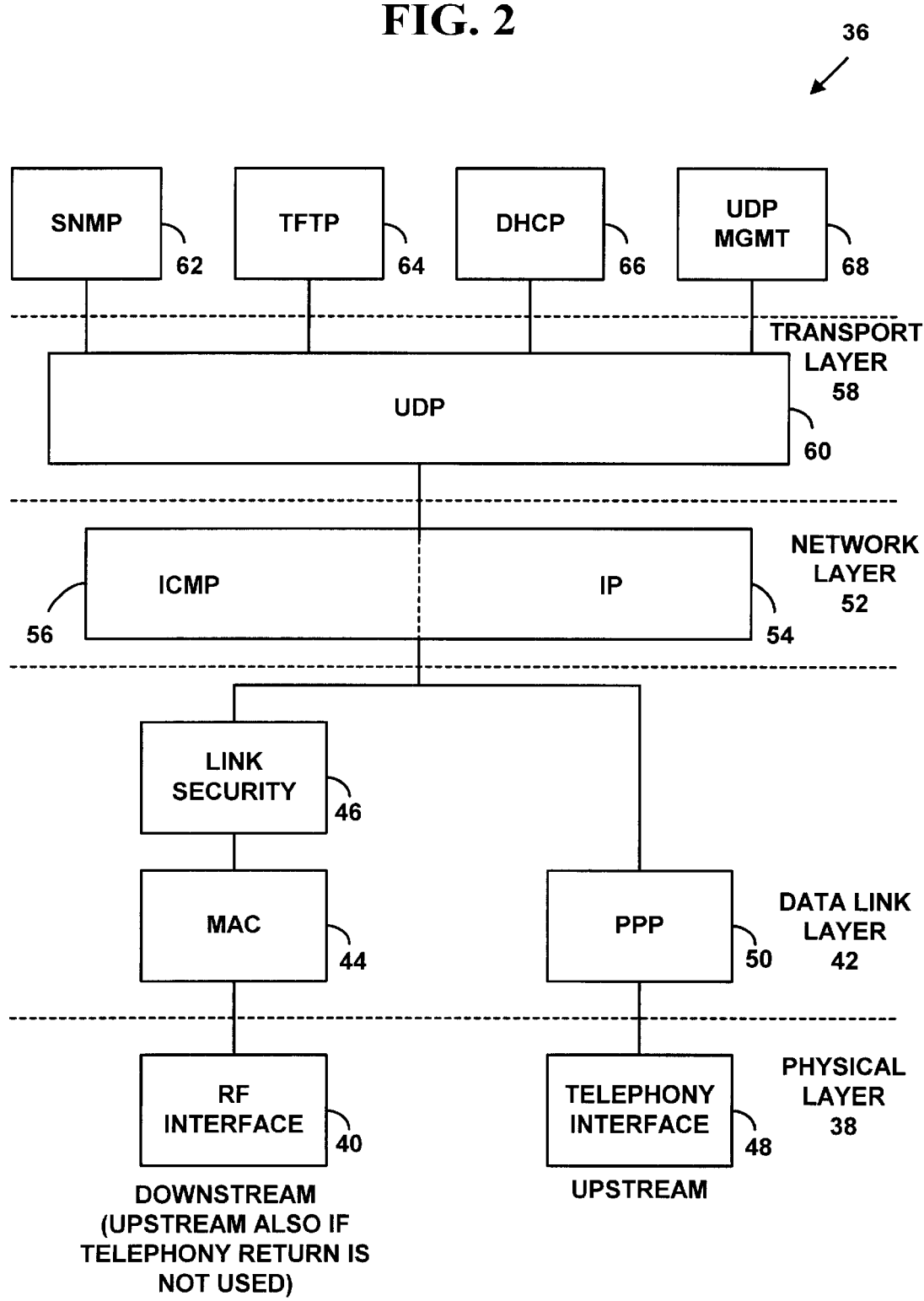

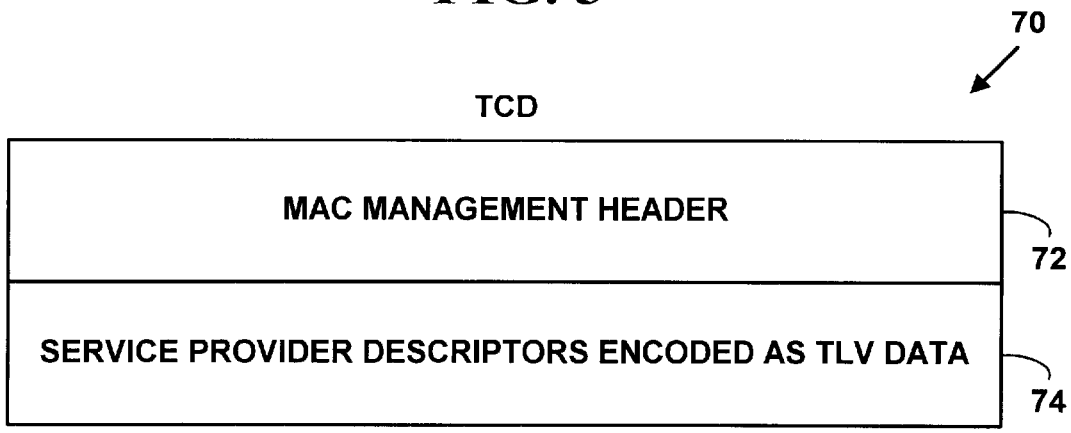
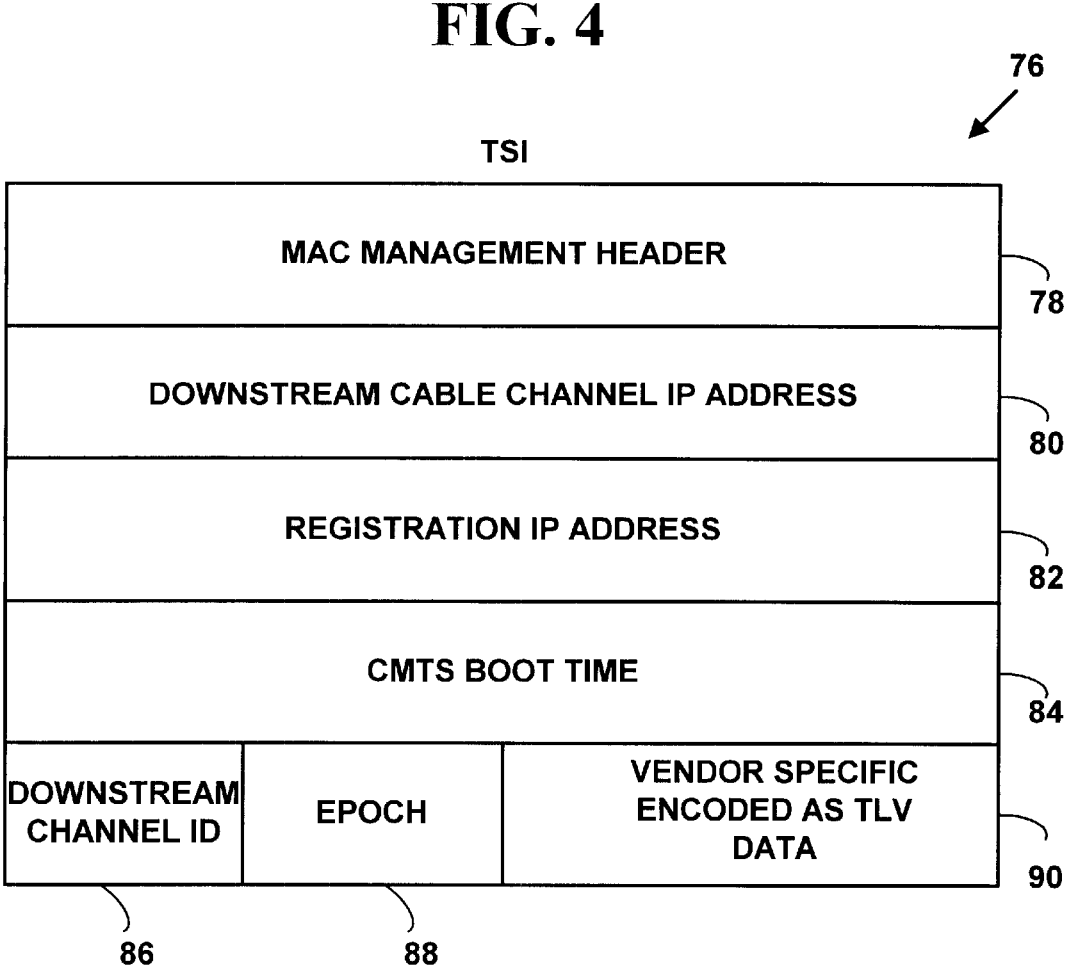

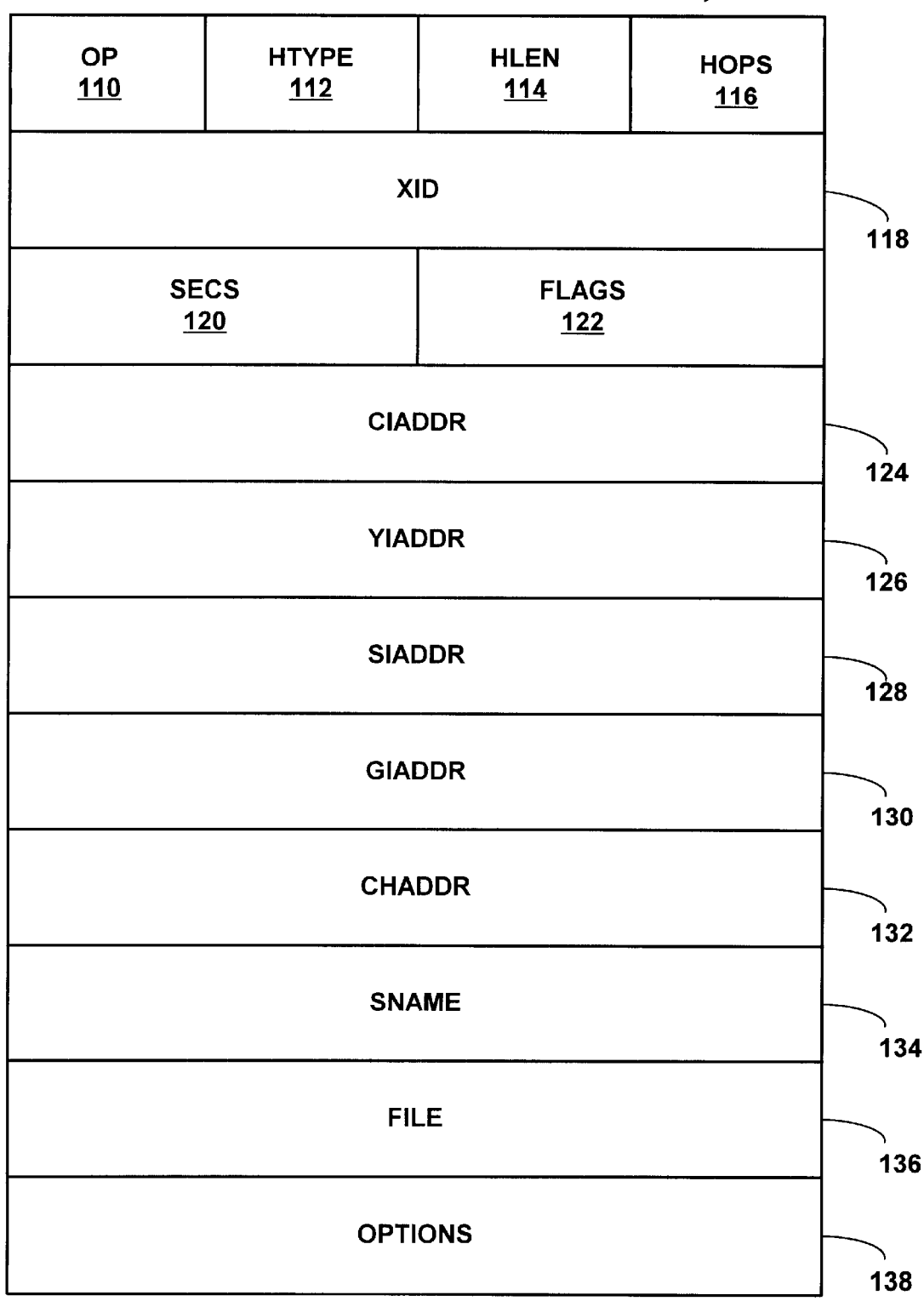

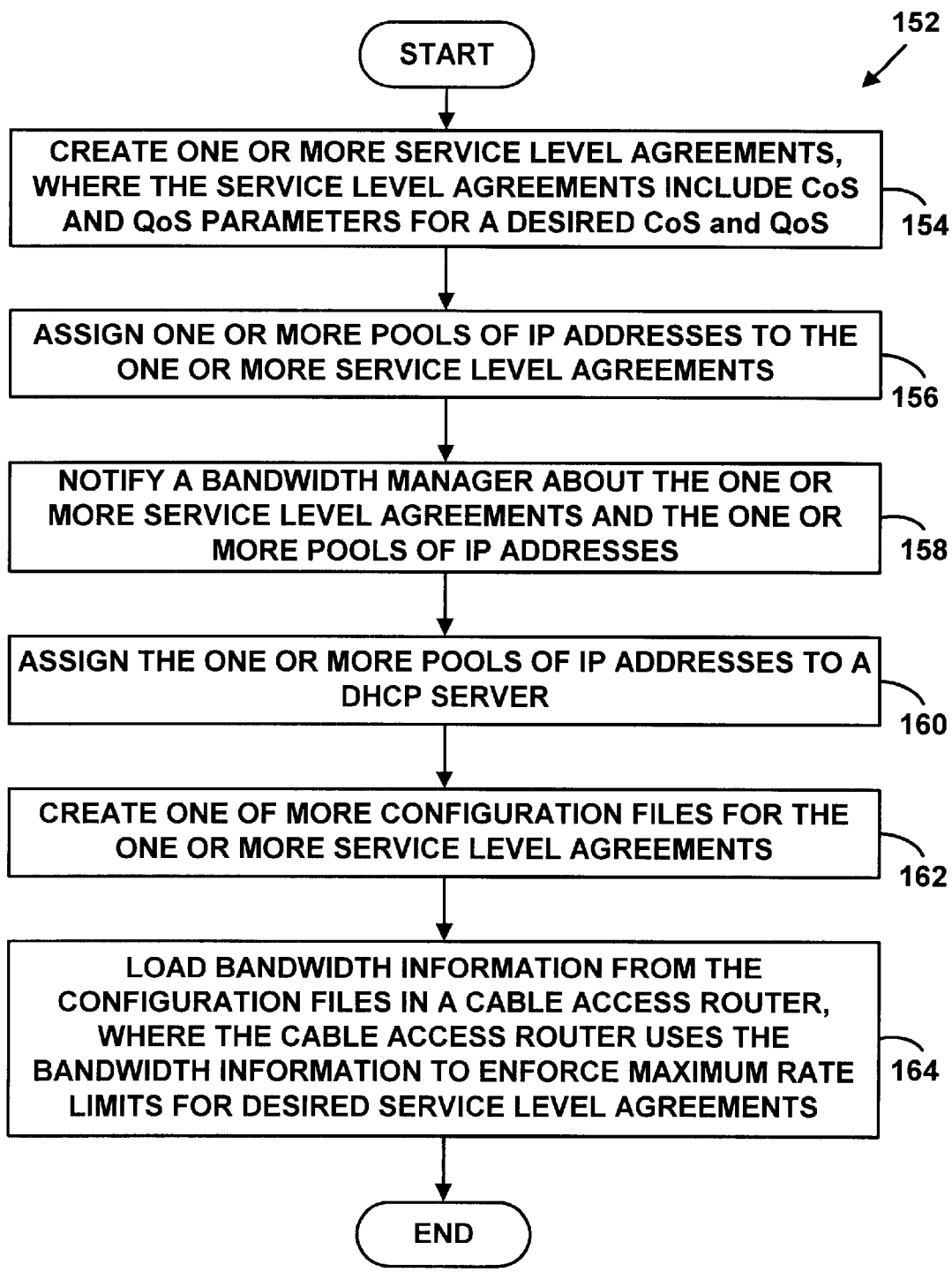

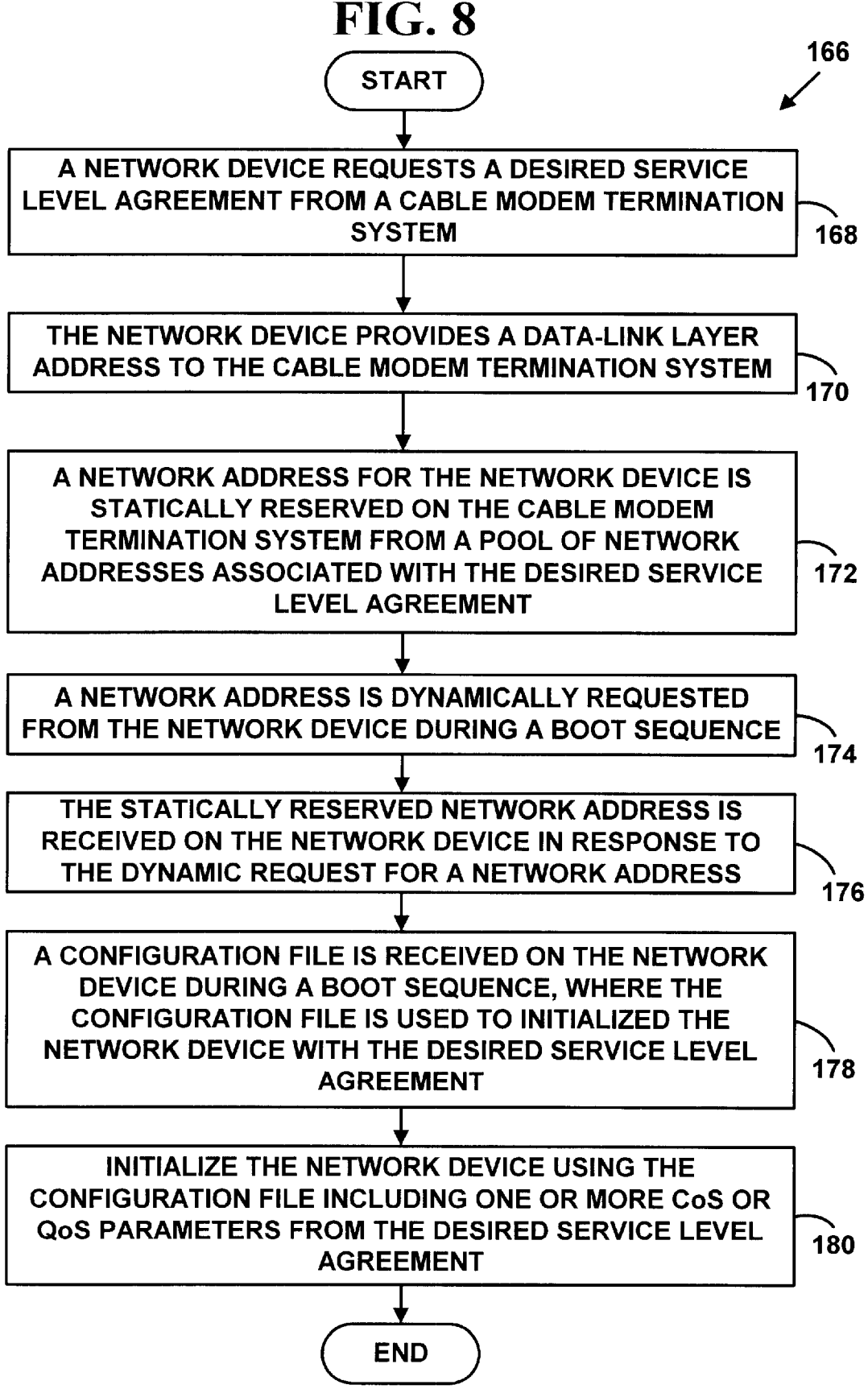

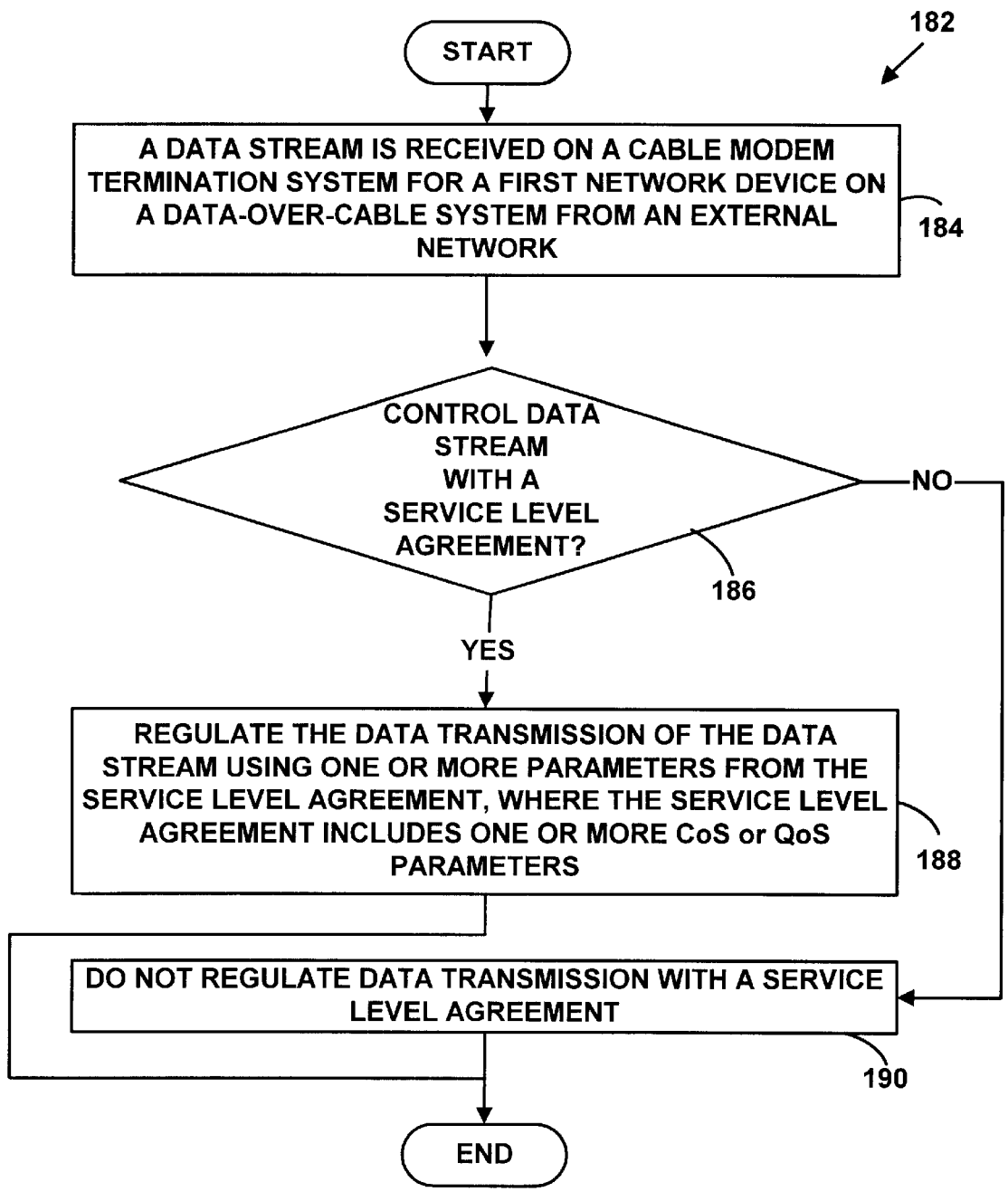

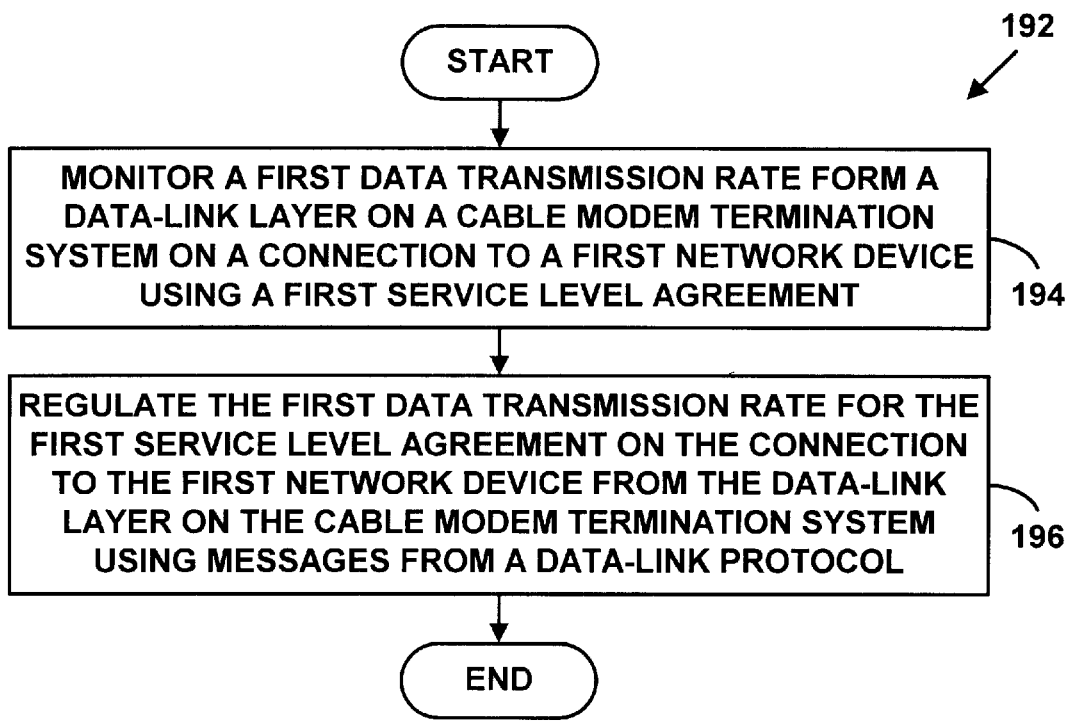

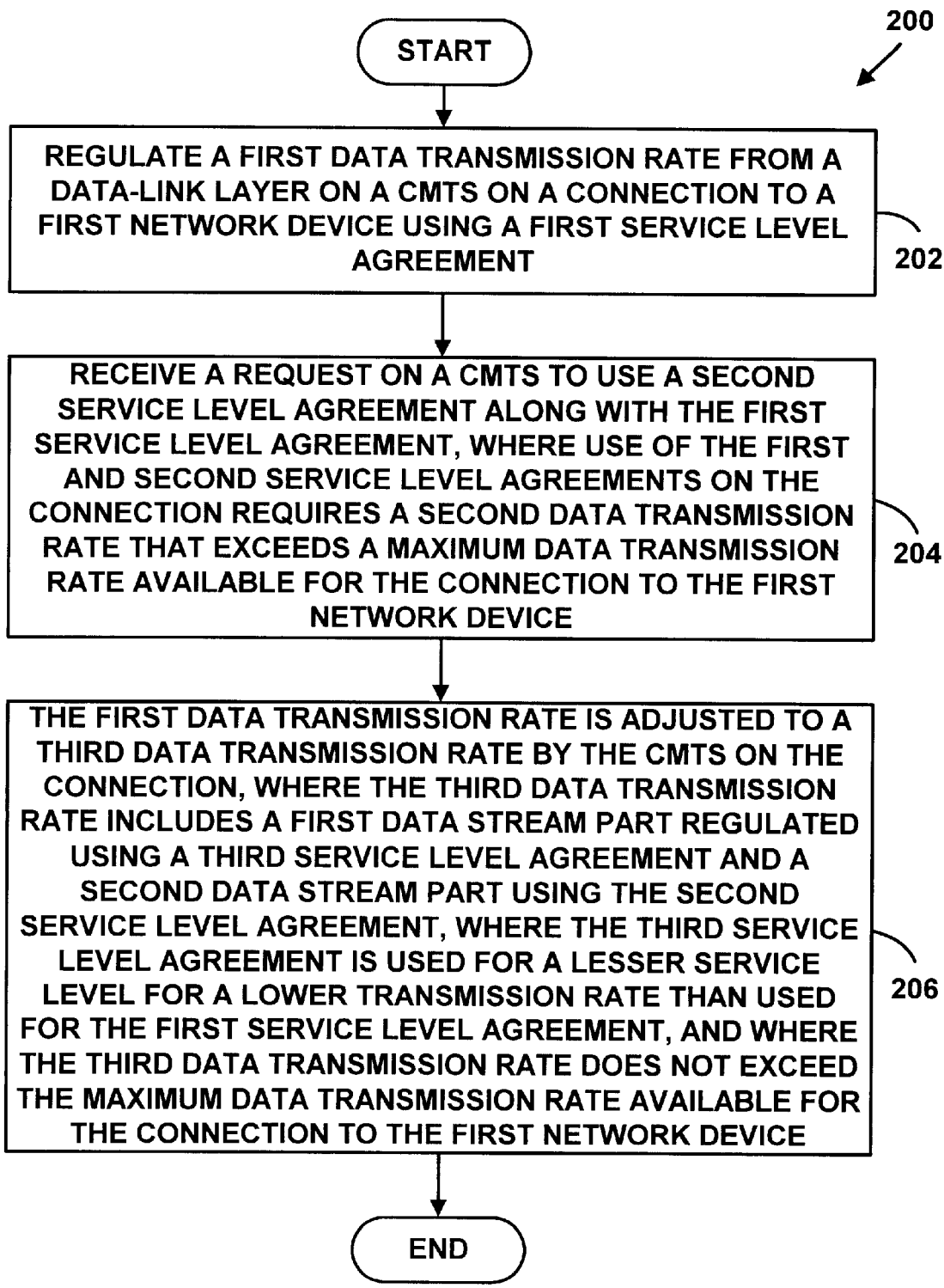

METHODS AND SYSTEMS FOR SERVICE LEVEL AGREEMENT ENFORCEMENT ON A DATA-OVER CABLE SYSTEM

FIELD OF INVENTION

The present invention relates to communications in computer networks. More specifically, it relates to data rate enforcement, such as class-of-service or quality-of-service service enforcement for service level agreements on a cable television network.

BACKGROUND OF THE INVENTION

Cable television networks such as those provided by Comcast Cable Communications, Inc., of Philadelphia, Pa., Cox Communications of Atlanta, Ga., Tele-Communications, Inc., of Englewood Colo., Time-Warner Cable, of Marietta Ga., Continental Cablevision, Inc., of Boston Mass., and others provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to about 30+ Mbps.

The Internet, a world-wide-network of interconnected computers, provides multi-media content including audio, video, graphics and text that typically requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to about 30+ Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation, of Santa Clara, Calif., Motorola Corporation, of Arlington Heights, Ill., Hewlett-Packard Co., of Palo Alto, Calif., Bay Networks, of Santa Clara, Calif., Scientific-Atlanta, of Norcross, Ga., General Instruments, of Horsham, Pa., and others offer customers higher-speed connectivity to the Internet, an intranet, Local Area Networks ("LANs") and other computer networks via cable television networks. These cable modems currently support a data connection to the Internet and other computer networks via a cable television network with a data rate of up to about 30+ Mbps, which is a much larger data rate than can be supported by a modem used over a serial telephone line.

However, many cable television networks provide only uni-directional cable systems, supporting only a "downstream" cable data path. A downstream data path is the flow of data from a cable system "headend" to a customer. A cable system headend is a central location in the cable television network that is responsible for sending cable signals in the downstream direction. A return data path via a telephone network (i.e., a "telephony return"), such as a public switched telephone network provided by AT&T, GTE, Sprint, MCI and others, is typically used for an "upstream" data path. An upstream data path is the flow of data from the customer back to the cable system headend. A cable television system with an upstream connection to a telephony network is called a "data-over-cable system with telephony return."

An exemplary data-over-cable system with telephony return includes customer premise equipment (e.g., a customer computer), a cable modem, a cable modem termination system, a cable television network, a public switched telephone network, a telephony remote access concentrator and a data network (e.g., the Internet). The cable modem termination system and the telephony remote access concentrator together are called a "telephony return termination system."

The cable modem termination system receives data packets from the data network and transmits them downstream via the cable television network to a cable modem attached to the customer premise equipment. The customer premise equipment sends response data packets to the cable modem, which sends response data packets upstream via public switched telephone network to the telephony remote access concentrator, which sends the response data packets back to the appropriate host on the data network.

In a two-way cable system without telephony return, the customer premise equipment sends response data packets to the cable modem, which sends the data packets upstream via the cable television network to the cable modem termination system. The cable modem termination system sends the data packets to appropriate hosts on the data network. The cable modem termination system sends the response data packets back to the appropriate cable modem.

As a cable modem is initialized in a data-over-cable system, it registers with a cable modem termination system to allow the cable modem to receive data over a cable television connection and from a data network (e.g., the Internet or an Intranet). The cable modem forwards configuration information it receives in a configuration file during initialization to the cable modem termination system as part of a registration request message. A cable modem also helps initialize and register any attached customer premise equipment with the cable modem termination system.

A cable modem termination system in a data-over-cable system typically manages connections to tens of thousands of cable modems. Most of the cable modems are attached to host customer premise equipment such as a customer computer. To send and receive data to and from a computer network like the Internet or an intranet, a cable modem and customer premise equipment and other network devices have a network address dynamically assigned on the data-over-cable system.

Many data-over-cable systems use a Dynamic Host Configuration Protocol ("DHCP") as a standard messaging protocol to dynamically allocate network addresses such as Internet Protocol ("IP") addresses. As is known in the art, the Dynamic Host Configuration Protocol is a protocol for passing configuration information to network devices on a network. The Internet Protocol is an addressing protocol designed to route traffic within a network or between networks.

Initialization information forwarded to a cable modem termination system from a cable modem may include Class-of-Service ("CoS") or Quality-of-Service ("QoS") requests. As is known in the art, class-of-service provides a reliable (i.e., error free, in sequence, with no loss of duplication) transport facility independent of the quality-of-service. Class-of-service parameters include maximum downstream data rates, maximum upstream data rates, upstream channel priority, guaranteed minimum data rates, guaranteed maximum data rate and other parameters. Quality-of-service collectively specifies the performance of a network service that a device expects on a network. Quality-of-service parameters include transit delay expected to deliver data to a specific destination, the level of protection from unauthorized monitoring or modification of data, cost for delivery of data, expected residual error probability, the relative priority associated with the data and other parameters.

A cable modem termination system is typically responsible for providing class-of-service and quality-of-service connections to a cable modem in a data-over-cable system. However, there are several problems associated with using a cable modem termination system to provide class-of-service and quality-of-service connections to a cable modem. One problem is that the cable modem termination system is responsible for handling and balancing class-of-service and quality-of-service requests for tens of thousands of cable modems. The handling and balancing class-of-service and quality-of-service includes allocating bandwidth for guaranteed transmission rates requested by the cable modems. The handling and balancing requires significant computational and computer resources on the cable modem termination system. The cable modem termination system uses complex software that is not easily adaptable to new or additional class-of-service or quality-of-service parameters. In addition, multiple cable modem termination systems in a data-over-cable systems typically do not handle or balance class-of-service or quality-of-service parameters in a standard way.

Another problem is that a cable modem termination system may have to bridge class-of-service or quality-of-service across networks with different underlying technologies (e.g., between a public switched telephone network and a cable television network or between the Internet or an intranet and a cable television network) without affecting system performance or throughput.

Another problem is that providing class-of-service and quality-of-service using a single networking device such as a cable modem termination system makes a network including such a networking device vulnerable to failures should the networking device fail. This could lead to user frustration for users who are willing to pay additional fees for desired class-of-service or quality-of-service features and not receive such features on a consistent basis.

Another problem is that current networking devices such as a cable modem termination system that provide class-of-service and quality-of-service typically do not detect network traffic trends, measure network response time or generate class-of-service and quality-of-service reports.

Yet another problem is that current networking devices such as a cable modem termination system that provide class-of-service and quality-of-service typically do not provide enforcement of service level agreements ("SLAs"). As is known in the art, service level agreements are used to determine what policies, programs and/or data transmission rates will be offered to customers.

Thus, it is desirable to provide a standard, efficient and reliable way to provide class-of-service or quality-of-service and service level agreements to customers in a data-over-cable system. The class-of-service or quality-of-service and service level agreements should also be provided across networks without affecting system performance or throughput.

SUMMARY OF THE INVENTION

In accordance with preferred embodiments of the present invention, some of the problems associated with providing class-of-service or quality-of-service on a data-over-cable system are overcome. One aspect of the invention includes a method for providing service level agreements. One or more service level agreements are created along with one or more pools of network addresses. Network addresses are assigned from the pools when a network device requests a desired service level agreement. One or more configuration files including class-of-service or quality-of-service parameters are also created to initialize a network device for a desired service level agreement.

Another aspect of the invention includes a method for requesting a service level agreement. A network device requests a service level agreement. The network device is assigned a network address from a pool of network addresses associated with the service level agreement. The network device also receives a configuration file including service level agreement parameters. The service level agreement includes one or more class-of-service or quality-of-service parameters. The configuration file is used to initialize the network device to allow the desired service level agreement to be used with the network address from the address pool.

Another aspect of the invention includes a method for enforcing service level agreements. A data stream from an external network is received on a cable modem termination system. The cable modem termination system determines if the data stream should be managed with a service level agreement. If so, the data stream is regulated using one or more parameters from the service level agreement.

Another aspect of the invention includes a method for monitoring and regulating data transmission using service level agreements. A cable modem termination system monitors and regulates data transmission rates using service level agreements from a data-link layer.

Another aspect of the invention includes a method for shaping data traffic using service level agreements. A cable modem termination system regulates data transmission rates using a first service level agreement. A request is made to regulate data transmission with a first and second service level agreement used on the same connection. Using the first and second service level agreements on the same connection may exceed a maximum data transmission rate for the connection. The cable modem termination system may adjust the data transmission rates on the connection to another data transmission rate using a third service level agreement along with the requested second service level agreement. The third service level agreement is used to provide a lower level service than provided with the first service level agreement. Adjusted Data transmission rates for the second and third service level agreements do not exceed the maximum data transmission rates on the connection.

Another aspect of the invention includes a system for enforcing service level agreements. The service level agreements are enforced using a cable modem termination system including an integral switch, cable access router and a bandwidth manager. The cable modem termination system with integral components, or just the integral components therein may be duplicated to provide a "hot back" up in case of failure and increase reliability using service level agreements. The switch switches data streams from external networks. The cable access router enforces maximum rate limits for service level agreements. The bandwidth manager provides class-of-service or quality-of-service services with policy management and detects network trends, measures network response time and generates reports. The bandwidth manager may also monitor, regulate and shape traffic based on service level agreement requests at a data-link layer level. The cable modem termination system may also include an associated Dynamic Host Configuration Protocol Server to allocate network addresses from an address pool associated with a desired service level agreement.

The methods and system of the present invention may allow service level agreements to be used on a data-over-cable system without adversely affecting performance or throughput on the data-over-cable system. The methods and system of the present invention may also help provide service level agreements on a data-over-cable system in more reliable manner.

The foregoing and other features and advantages of a preferred embodiment of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 2 is a block diagram illustrating a protocol stack for a cable modem;

FIG. 3 is a block diagram illustrating a Telephony Channel Descriptor message structure;

FIG. 4 is a block diagram illustrating a Termination System Information message structure;

FIG. 5 is a block diagram illustrating a Dynamic Host Configuration Protocol message structure;

FIG. 7 is a flow diagram illustrating a method for providing bandwidth provisioning;

FIG. 8 is a flow diagram illustrating a method for requesting service level agreements;

FIG. 9 is a flow diagram illustrating a method for enforcing bandwidth provisioning for service level agreements;

FIG. 10 is a flow diagram illustrating a method for monitoring and regulating data transmission using service level agreements; and FIG. 11 is a flow diagram illustrating a method for shaping data traffic using service level agreements.

DETAILED DESCRIPTION OF PREFERRED EMBODIMENTS

Exemplary Data-over-cable System

Figure 1:
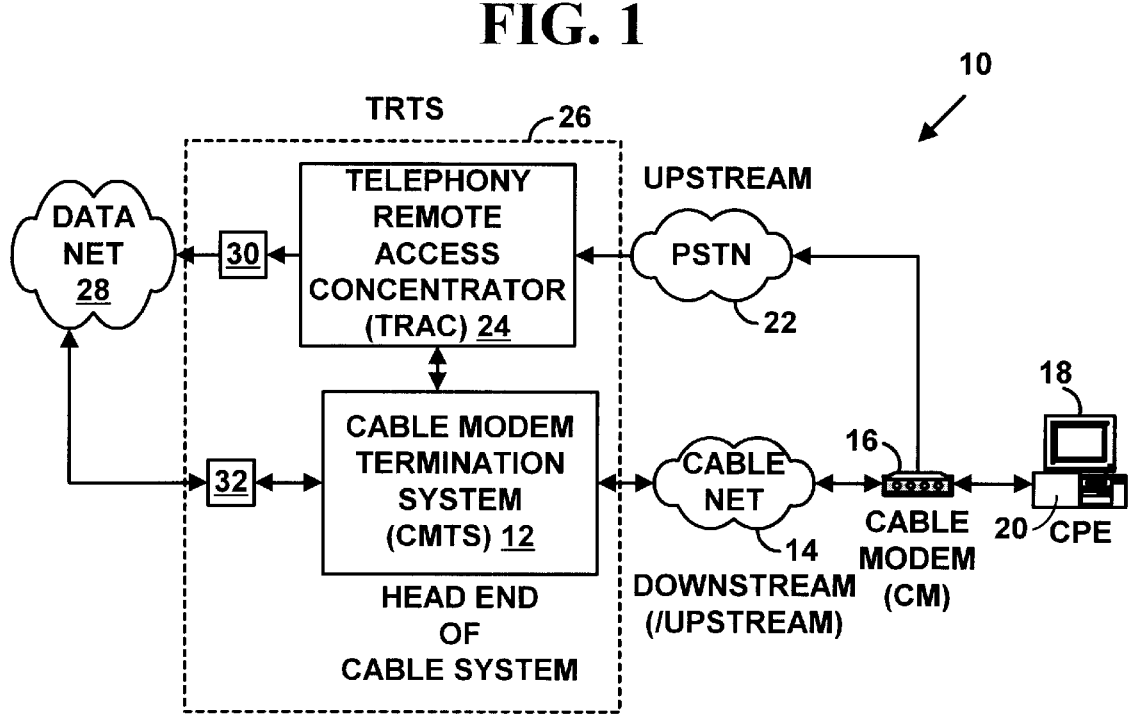
FIG. 1 is a block diagram illustrating a cable modem system with telephony return.

FIG. 1 is a block diagram illustrating an exemplary data-over-cable system 10. Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in uni-directional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1. The present invention is not limited to a data-over-cable system with telephony return. In a data-over cable system without telephony return, customer premise equipment or a cable modem has an upstream connection to the cable modem termination system via a cable television connection, a wireless connection, a satellite connection, or a connection via other technologies to send data upstream to the cable modem termination system. Data-over-cable system 10 includes a Cable Modem Termination System ("CMTS") 12 connected to a cable television network 14, hereinafter cable network 14. FIG. 1 illustrates one CMTS 12. However, data-over-cable system 10 can include multiple CMTS 12.

In one preferred embodiment of the present invention, the CMTS 12 is a Total Control hub by 3Com Corporation of Santa Clara, Calif., with a cable modem termination unit. A Total Control hub is a chassis with multiple networking cards connected by a common bus. An exemplary Total Control hub is described in U.S. Pat. No. 5,528,595, granted to Dale M. Walsh et al., and incorporated is herein by reference. However, the CMTS 12 could also be another network servers including those by Lucent Technologies of Murray Hill, N.J., Livingston Enterprises, Inc. of Pleasanton, Calif., Ascend Communications of Alameda, Calif., Cisco Systems, Inc., of San Jose, Calif. and others.

The Cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. The cable network 14 is connected to a Cable Modem ("CM") 16 with a downstream cable connection. The CM 16 is any cable modem such as those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta, of Norcross, Ga., General Instruments of Horsham, Pa., and others. FIG. 1 illustrates one CM 16. However, in a typical data-over-cable system, tens or hundreds of thousands of the CMs 16 are connected to the CMTS 12. The CM 16 is connected to Customer Premise Equipment ("CPE") 18 such as a personal computer system via a Cable Modem-to-CPE Interface ("CMCI") 20.

One CPE 18 is illustrated in FIG. 1. However, the CM 16 may have multiple CPEs 18 attached (Not illustrated in FIG. 1). In one preferred embodiment of the present invention, the CM 16 is connected to a Public Switched Telephone Network ("PSTN") 22 with an upstream telephony connection. The PSTN 22 includes those public switched telephone networks provided by AT&T, Regional Bell Operating Companies (e.g., Ameritech, U.S. West, Bell Atlantic, Southern Bell Communications, Bell South, NYNEX, and Pacific Telesis Group), GTE, Sprint, MCI and others. The upstream telephony connection is any of a standard telephone line connection, Integrated Services Digital Network ("ISDN") connection, Asymmetric Digital Subscriber Line ("ADSL") connection, a wireless connection or other telephony connection. The PSTN 22 is connected to a Telephony Remote Access Concentrator ("TRAC") 24.

In another preferred embodiment of the present invention, in a data-over cable system without telephony return, the CM 16 has an upstream connection to the CMTS 12 via a cable television connection, a wireless connection, a satellite connection, or a connection via other technologies to send data upstream outside of the telephony return path. An upstream cable television connection via cable network 14 is also illustrated in FIG. 1. In such an embodiment, the CMTS 12 may also provide data streams involving voice, video or data information to a CM 16, or CPE 18 from the PSTN 22 even when a telephony return path is not used.

FIG. 1 illustrates a telephony modem integral to the CM 16. In another embodiment of the present invention, the telephony modem is a separate modem unit external to the CM 16 used specifically for connecting with the PSTN 22. A separate telephony modem includes a connection to the CM 16 for exchanging data. In yet another embodiment of the present invention, the CM 16 includes functionality to connect only to the cable network 14 and receives downstream signals from the cable network 14 and sends upstream signals to the cable network 14 without using the telephony return path. The present invention is not limited to cable modems used in a data-over-cable system with telephony return.

In one preferred embodiment of the present invention of the telephony return, the TRAC 24 is a Total Control Telephony Hub by 3Com Corporation of Santa Clara, Calif. However, the TRAC 24 could also be a telephony hub including those by Lucent Technologies of Murray Hill, N.J., Livingston Enterprises, Inc. of Pleasanton, Calif., Ascend Communications of Alameda, Calif. and others.

The CMTS 12 and the TRAC 24 may be at a "headend" of cable system 10, or the TRAC 24 may be located elsewhere and have routing associations to the CMTS 12. The CMTS 12 and the TRAC 24 together are called a "Telephony Return Termination System" ("TRTS") 26. The TRTS 26 is illustrated by a dashed box in FIG. 1. The CMTS 12 and the TRAC 24 make up the TRTS 26 whether or not they are located at the headend of cable network 14. The TRAC 24 may be located in a different geographic location from the CMTS 12. Content servers, operations servers, administrative servers and maintenance servers used in data-over-cable system 10 (not shown in FIG. 1) may also be in different locations. Access points to the data-over-cable system 10 are connected to one or more of the CMTS 12, or cable headend access points. Such configurations may be "one-to-one", "one-to-many," or "many-to-many," and may be interconnected to other Local Area Networks ("LANs") or Wide Area Networks ("WANs").

The TRAC 24 is connected to a data network 28 (e.g., the Internet, an intranet or other LAN) by a TRAC-Network System Interface 30 ("TRAC-NSI"). The CMTS 12 is connected to data network 28 by a CMTS-Network System Interface ("CMTS-NSI") 32. The CMTS 12 may send and receive data to/from a CM16 or a CPE 18 via the PSTN 22 even if telephony return is not used. The present invention is not limited to data-over-cable system 10 illustrated in FIG. 1, and more or fewer components, connections and interfaces could also be used. The present invention may also be used in a data-over-cable system 10 with or without telephony return.

Network Device Protocol Stack

FIG. 2 is a block diagram illustrating a protocol stack 36 for network devices in data-over-cable system 10. In one exemplary preferred embodiment of the present invention, network devices in the data-over-cable system 10 are compliant with Data-Over-Cable-Service-Interface-Specification ("DOCSIS") standards from the Multimedia Cable Network Systems ("MCNS"), incorporated herein by reference. The DOCSIS standards can be found on the World Wide Web at the Universal Resource Locator ("URL") "www.cablemodem.com." However, other standards may also be used and the present invention is not limited to network devices compliant with DOCSIS and MCNS. However FIG. 2 illustrates the downstream and upstream protocols used, for example, in the CM 16. As is known in the art, the Open System Interconnection ("OSI") model is used to describe computer networks. The OSI model consists of seven layers including from lowest-to-highest, a physical, data-link, network, transport, session, presentation and application layer. The physical layer transmits bits over a communication link. The data link layer transmits error free frames of data. The network layer transmits and routes data packets.

For downstream data transmission, network devices including the CM 16 are connected to cable network 14 in a physical layer 38 via a Radio Frequency ("RF") Interface 40. In a preferred embodiment of the present invention, RF Interface 40 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. The RF interface 40 uses a signal modulation method, such as Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in the RF interface 40. However, other operating frequencies and modulation methods could also be used (e.g., Quadrature Phase Shift Keying ("QPSK") modulation). For more information on the RF interface 40 see the Institute of Electrical and Electronic Engineers ("IEEE") standard 802.14 for cable modems incorporated herein by reference. IEEE standards can be found on the World Wide Web at the URL "www.ieee.org." However, other RF interfaces 40 could also be used and the present invention is not limited to IEEE 802.14 (e.g., RF interfaces from MCNS) and others could also be used).

Above the RF interface 40 in a data-link layer 42 is a Medium Access Control ("MAC") layer 44. As is known in the art, the MAC layer 44 controls access to a transmission medium via physical layer 38. For more information on the MAC layer protocol 44 see IEEE 802.14 for cable modems. However, other MAC layer protocols 44 could also be used and the present invention is not limited to IEEE 802.14 MAC layer protocols (e.g., MCNS MAC layer protocols and others could also be used).

Above the MAC layer 44 is an optional link security protocol stack 46. The link security protocol stack 46 prevents unauthorized users from making a data connection from cable network 14. The RF interface 40 and the MAC layer 44 can also be used for an upstream cable connection in a data-over-cable system 10 without telephony return.

For upstream data transmission with telephony return, the CM 16 is connected to the PSTN 22 in physical layer 38 via telephony interface 48. The International Telecommunications Union-Telecommunication Standardization Sector ("ITU-T", formerly known as the CCITT) defines standards for communication devices identified by "V.xx" series where "xx" is an identifying number. ITU-T standards can be found on the World Wide Web at the URL "www.itu.ch."

In one embodiment of the present invention, ITU-T V.34 is used as telephony interface 48. As is known in the art, ITU-T V.34 is commonly used in the data link layer for modem communications and currently allows data rates as high as 33,600 bits-per-second ("bps"). For more information see the ITU-T V.34 standard. However, modem interfaces (e.g., V.90) or other telephony interfaces could also be used. For example, an Asymmetric Digital Subscriber Link ("ADSL"), an Integrated Services Digital Network ("ISDN") or a wireless telephony interface could also be used for the telephony interface 48.

Above the telephony interface 48, in the data link layer 42, is a Point-to-Point Protocol ("PPP") layer 50, hereinafter PPP 50. As is known in the art, PPP 50 is used to encapsulate network layer datagrams over a serial communications link. For more information on PPP 50 see Internet Engineering Task Force ("IETF") Request for Comments ("RFC"), RFC-1661, RFC-1662 and RFC-1663, incorporated herein by reference. Information for IETF RFCs can be found on the World Wide Web at URLs "ds.internic.net" or "www.ietf.org."

Above both the downstream and upstream protocol layers in a network layer 52 is an Internet Protocol ("IP") layer 54. IP layer 54, hereinafter IP 54, roughly corresponds to OSI layer 3, the network layer, but is typically not defined as part of the OSI model. As is known in the art, IP 54 is a routing protocol designed to route traffic within a network or between networks. For more information on IP 54 see, RFC-791, incorporated herein by reference.

Internet Control Message Protocol ("ICMP") layer 56 is used for network management. The main functions of ICMP layer 56, hereinafter ICMP 56, include error reporting, reachability testing (e.g., "pinging"), congestion control, route-change notification, performance, subnet addressing and others. Since IP 54 is an unacknowledged protocol, datagrams may be discarded and ICMP 56 is used for error reporting. For more information on ICMP 56 see, RFC-792, incorporated herein by reference.

Above IP 54 and ICMP 56 is a transport layer 58 with a User Datagram Protocol layer 60 ("UDP"). UDP layer 60, hereinafter UDP 60, roughly corresponds to OSI layer 4, the transport layer, but is typically not defined as part of the OSI model. As is known in the art, UDP 60 provides a connectionless mode of communications with datagrams. For more information on UDP 60 see RFC-768, incorporated herein by reference. Transmission Control Protocol ("TCP") may also be used in the transport layer 58. For more information on TCP see RFC-793, incorporated by reference.

Above the network layer are a Simple Network Management Protocol ("SNMP") layer 62, Trivial File Transfer Protocol ("TFTP") layer 64, Dynamic Host Configuration Protocol ("DHCP") layer 66 and a UDP manager 68. SNMP layer 62 is used to support network management functions. For more information on SNMP layer 62 see RFC-1157, incorporated herein by reference. TFTP layer 64 is a file transfer protocol used to download files and configuration information. For more information on TFTP layer 64 see RFC-1350, incorporated herein by reference. The DHCP layer 66 is a protocol for passing configuration information to hosts on an IP 54 network. For more information on the DHCP layer 66 see, RFC-1541, and RFC-2131 and RFC-2132, incorporated herein by reference. UDP manager 68 distinguishes and routes packets to an appropriate service (e.g., a virtual tunnel). More or few protocol layers could also be used with data-over-cable system 10.

The CM 16 supports transmission and reception of IP 54 datagrams as specified by RFC-791. The CMTS 12 and the TRAC 24 may also perform filtering of IP 54 datagrams. The CM 16 is also configurable for IP 54 datagram filtering to restrict the CM 16 and the CPE 18 to the use of only their assigned IP 54 addresses. The CM 16 is configurable for IP 54 datagram UDP 60 port filtering (i.e., deep filtering).

The CM 16 forwards IP 54 datagrams destined to an IP 54 unicast address across the cable network 14 or the PSTN 22.

Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between the TRAC 24 and/or the CMTS 12 which preclude filtering, or various forms of virtual tunneling and reverse virtual tunneling could be used to virtually source upstream packets from the CM 16. For more information on virtual tunneling, see Level 2 Tunneling Protocol ("L2TP") or Point-to-Point Tunneling Protocol ("PPTP") in IETF draft documents by Kory Hamzeh (IETF draft documents are precursors to IETF RFCs and are works in progress), incorporated herein by reference.

The CM 16 also forwards IP 54 datagrams destined to an IP 54 multicast address across the cable network 14 or the PSTN 22. The CM 16 is configurable to keep IP 54 multicast routing tables and to use group membership protocols. The CM 16 is also capable of IP 54 tunneling upstream through the telephony path. A CM 16 that wants to send a multicast packet across a virtual tunnel will prepend another IP 54 header, set the destination address in the new header to be the unicast address of the CMTS 12 at the other end of the tunnel, and set the IP 54 protocol field to be four, which means the next protocol is IP 54.

The CMTS 12 at the other end of the virtual tunnel receives the packet, strips off the encapsulating IP 54 header, and forwards the packet as appropriate. A broadcast IP 54 capability is dependent upon the configuration of the direct linkage, if any, between the TRAC 24 and the CMTS 12. The CMTS 12, the CM 16, and the TRAC 24 are capable of routing IP 54 datagrams destined to an IP 54 broadcast address which is across the cable network 14 or the PSTN 22 if so configured. The CM 16 is configurable for IP 54 broadcast datagram filtering.

An operating environment for the CMTS 12, the CM 16, the CPE 18, the TRAC 24 and other network devices of the present invention includes a processing system with at least one high speed Central Processing Unit ("CPU") and a memory system. In accordance with the practices of persons skilled in the art of computer programming, the present invention is described below with reference to acts and symbolic representations of operations or instructions that are performed by the processing system, unless indicated otherwise. Such acts and operations or instructions are sometimes referred to as being "computer-executed", or "CPU executed."

It will be appreciated that the acts and symbolically represented operations or instructions include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Initialization of a Cable Modem

When the CM 16 is initially powered on, if telephony return is being used, the CM 16 will receive a Telephony Channel Descriptor ("TCD") from the CMTS 12 that is used to provide dialing and access instructions on downstream channels via cable network 14. Information in the TCD is used by the CM 16 to connect to the TRAC 24. The TCD is transmitted as a MAC 44 management message with a management type value of TRI_TCD at a periodic interval (e.g., every 2 seconds). To provide for flexibility, the TCD message parameters are encoded in a Type/Length/Value ("TLV") form. However, other encoding techniques could also be used. FIG. 3 is a block diagram illustrating a TCD message structure 70 with MAC 44 management header 72 and Service Provider Descriptor(s) ("SPD") 74 encoded in TLV format. SPDs 74 are compound TLV encodings that define telephony physical-layer characteristics that are used by the CM 16 to initiate a telephone call. The SPD 74 is a TLV-encoded data structure that contains sets of dialing and access parameters for the CM 16 with telephony return. The SPD 74 is contained within TCD message 70. There may be multiple SPD 74 encodings within a single TCD message 70. There is at least one SPD 74 in the TCD message 70. The SPD 74 parameters are encoded as SPD-TLV tuples. The SPD 74 contains the parameters shown in Table 1 and may contain optional vendor specific parameters. However, more or fewer parameters could also be used in the SPD 74.

TABLE 1

| SPD 74 Parameter | Description |
| --- | --- |
| Factory Default Flag | Boolean value, if TRUE(1), indicates a SPD which should be used by the CM 16. |
| Service Provider Name | This parameter includes the name of a service provider. Format is standard ASCII string composed of numbers and letters. |
| Telephone Numbers | These parameters contain telephone numbers that the CM 16 uses to initiate a telephony modem link during a login process. Connections are attempted in ascending numeric order (i.e., Phone Number 1, Phone Number 2 . . . ). The SPD contains a valid telephony dial string as the primary dial string (Phone Number 1), secondary dial-strings are optional. Format is ASCII string(s) composed of: any sequence of numbers, pound "#" and star "*" keys and a comma character "," that is used to indicate a two second pause in dialing. |
| Connection Threshold | The number of sequential connection failures before indicating connection failure. A dial attempt that does not result in an answer and connection after no more than ten rings is considered a failure. The default value is one. |
| Login User Name | This contains a user name the CM 16 will used in an authentication protocol over the telephone link during the initialization procedure. Format is a monolithic sequence of alphanumeric characters in an ASCII string composed of numbers and letters. |
| Login Password | This contains a password that the CM 16 will use during authentication over a telephone link during the initialization procedure. Format is a monolithic sequence of alphanumeric characters in an ASCII string composed of numbers and letters. |
| DHCP 66 Authenticate | Boolean value, reserved to indicate that the CM 16 uses a specific indicated DHCP 66 Server (see next parameter) for |

TABLE 1-continued

| SPD 74 Parameter | Description |
| --- | --- |
|  | a DHCP 66 Client and BOOTP Relay Process when TRUE (one). The default is FALSE (zero) which allows any DHCP 66 Server. |
| DHCP 66 Server | IP 54 address value of a DHCP 66 Server the CM 16 uses in the DHCP 66 Client and BOOTP Relay Process when the DHCP 66 Authenticate attribute is TRUE(1) and this attribute is present. The default value is integer zero. |
| RADIUS Realm | The realm name is a string that defines a Remote Authentication Dial In User Service ("RADIUS") server domain. Format is a monolithic sequence of alphanumeric characters in an ACSII string composed of numbers and letters. |
| PPP 50 Authentication | This parameter instructs the telephone modem which authentication procedure to perform over the telephone link. |
| Demand Dial Timer | This parameter indicates time (in seconds) of inactive networking time that will be allowed to elapse before hanging up a telephone connection at CM 16. If this optional parameter is not present, or set to zero, then the demand dial feature is not activated. The default value is zero. |
| Vendor Specific Extensions | Optional vendor specific extensions. |

A Termination System Information ("TSI") message is transmitted by the CMTS 12 at periodic intervals (e.g., every 2 seconds) to report CMTS 12 information to the CM 16 whether or not telephony return is used. The TSI message is transmitted as a MAC 44 management message. The TSI provides a CMTS 12 boot record in a downstream channel to the CM 16 via cable network 14. Information in the TSI is used by the CM 16 to obtain information about the status of the CMTS 12. The TSI message has a MAC 44 management type value of TRI_TSI.

FIG. 4 is a block diagram of a TSI message structure 76. The TSI message structure 76 includes a MAC 44 management header 78, a downstream channel IP address 80, a registration IP address 82, a CMTS 12 boot time 84, a downstream channel identifier 86, an epoch time 88 and vendor specific TLV encoded data 90.

A description of the fields of TSI message 76 are shown in Table 2. However, more or fewer fields could also be used in TSI message 76.

TABLE 2

| TSI 76 Parameter | Description |
| --- | --- |
| Downstream Channel IP Address 80 | This field contains an IP 54 address of the CMTS 12 available on the downstream channel this message arrived on. |
| Registration IP Address 82 | This field contains an IP 54 address the CM 16 sends its registration request messages to. This address MAY be the same as the Downstream Channel IP 54 address. |
| CMTS Boot Time 84 | Specifies an absolute-time of a CMTS 12 recorded epoch. The clock setting for this epoch uses the current clock time with an unspecified accuracy. Time is represented as a 32 bit binary number. |

TABLE 2-continued

| TSI 76 Parameter | Description |
| --- | --- |
| Downstream Channel ID 86 | A downstream channel on which this message has been transmitted. This identifier is arbitrarily chosen by CMTS 12 and is unique within the MAC 44 layer. |
| Epoch 88 | An integer value that is incremented each time the CMTS 12 is either re-initialized or performs address or routing table flush. |
| Vendor Specific Extensions 90 | Optional vendor extensions may be added as TLV encoded data. |

If telephony return is being used, after receiving the TCD 70 message and the TSI message 76, the CM 16 continues to establish access to data network 28 (and resources on the network) by first dialing into the TRAC 24 and establishing a telephony PPP 50 session. Upon the completion of a successful PPP 50 connection, the CM 16 performs PPP 50 Link Control Protocol ("LCP") negotiation with the TRAC 24.

Once LCP negotiation is complete, the CM 16 requests Internet Protocol Control Protocol ("IPCP") address negotiation for an upstream telephony return path. For more information on IPCP see RFC-1332, incorporated herein by reference. During IPCP negotiation, the CM 16 negotiates, via PPP 50, an IP 54 address with the TRAC 24 for sending IP 54 data packet responses back to data network 28 via the TRAC 24.

When the CM 16 has established an upstream IP 54 link to TRAC 24, it begins "upstream" communications to the CMTS 12 via the DHCP layer 66 to complete a virtual data connection by attempting to discover network host interfaces available on the CMTS 12 (e.g., IP 54 host interfaces for a virtual IP 54 connection). The virtual data connection allows the CM 16 to receive data from data network 28 via the CMTS 12 and cable network 14, and send return data to data network 28 via TRAC 24 and PSTN 22. The CM 16 must first determine an address of a network host interface (e.g., an IP 54 interface) associated with the CMTS 12 that can be used by data network 28 to send data to the CM 16. In one preferred embodiment of the present invention, the CM 16 has only a downstream cable connection from the CMTS 12 and will obtain a connection address to the data network 28 using an upstream telephony connection to the TRAC 24. In another preferred embodiment of the present invention, the CM 16 will obtain a connection address to the cable network using an upstream cable connection to the CMTS 12.

An exemplary data path through cable system 10 is illustrated in Table 3. However other data paths could also be used and the present invention is not limited to the data paths shown in Table 3. For example, the CM 16 may send data upstream back through the cable network 14 (e.g., the CM 16 to cable network 14 to the CMTS 12 and to the data network 28 through CMTS NSI 32) and not use the PSTN 22, the TRAC 24, or the telephony return upstream path at all.

TABLE 3

1 An IP 54 datagram from data network 28 destined for the CM 16 arrives on the CMTS-NSI 32 and enters the CMTS 12.
2. CMTS 12 encodes the IP 54 datagram in a cable data frame, passes it to MAC 44 and transmits it "downstream" to RF interface 40 on the CM 16 via cable network 14.

TABLE 3-continued

3. CM 16 recognizes the encoded IP 54 datagram in MAC layer 44 received via RF interface 40.
4. CM 16 responds to the cable data frame and encapsulates a response IP 54 datagram in a PPP 50 frame and transmits it "upstream" with telephony interface 48 via the PSTN 22 to TRAC 24.
5 TRAC 24 decodes the IP 54 datagram and forwards it via TRAC-NSI 30 to a destination on the data network 28.
6. In a two-way cable system, the CM 16 encapsulates a response IP 54 datagram in a cable data frame passes it to MAC 44 and transmits it "upstream" via CM 16 RF interface 40 to the CMTS 12 via cable network 14.
7. In a two-way cable system, the CMTS 12 decodes the IP 54 datagram from the cable frame and forwards it via TRAC-NSI 32 to a destination on the data network 28.

Dynamic Network Host Configuration on a Data-over-cable System

As was illustrated in FIG. 2, the CM 16 includes a Dynamic Host Configuration Protocol ("DHCP") layer 66, hereinafter the DHCP 66. The DHCP 66 is used to provide configuration parameters to hosts on a network (e.g., an IP 54 network). The DHCP 66 consists of two components: a protocol for delivering host-specific configuration parameters from a DHCP 66 server to a host and a mechanism for allocation of network host addresses to hosts. DHCP 66 is built on a client-server model, where designated DHCP 66 servers allocate network host addresses and deliver configuration parameters to dynamically configured network host clients.

FIG. 5 is a block diagram illustrating an exemplary DHCP 66 message structure 108. The format of the DHCP 66 messages is based on the format of BOOTstrap Protocol ("BOOTP") messages described in RFC-951 and RFC-1542, incorporated herein by reference. From a network host client's point of view, the DHCP 66 is an extension of the BOOTP mechanism. This behavior allows existing BOOTP clients to interpret with the DHCP 66 servers without requiring any change to network host clients' BOOTP initialization software. The DHCP 66 provides persistent storage of network parameters for network host clients.

To capture BOOTP relay agent behavior described as part of the BOOTP specification and to allow interoperability of existing BOOTP clients with the DHCP 66 servers, the DHCP 66 server uses a BOOTP message format. Using BOOTP relaying agents eliminates the necessity of having a DHCP 66 server on each physical network segment.

DHCP 66 message structure 108 includes an operation code field 110 ("op"), a hardware address type field 112 ("htype"), a hardware address length field 114 ("hlen"), a number of hops field 116 ("hops"), a transaction identifier field 118 ("xid"), a seconds elapsed time field 120 ("secs"), a flags field 122 ("flags"), a client IP address field 124 ("ciaddr"), a your IP address field 126 ("yiaddr"), a server IP address field 128 ("siaddr"), a gateway/relay agent IP address field 130 ("giaddr"), a client hardware address field 132 ("chaddr"), an optional server name field 134 ("sname"), a boot file name 136 ("file") and an optional parameters field 138 ("options"). Descriptions for an exemplary DHCP 66 message 108 fields are shown in Table 4a.

TABLE 4a

| DHCP 66 Parameter | Description |
|---|---|
| OP 110 | Message op code/message type. 1 = BOOTREQUEST, 2 = BOOTREPLY. |
| HTYPE 112 | Hardware address type (e.g., '1' = 10 Mps Ethernet). |
| HLEN 114 | Hardware address length (e.g. '6' for 10 Mbps Ethernet). |
| HOPS 116 | Client sets to zero, optionally used by relay-agents when booting via a relay-agent. |
| XID 118 | Transaction ID, a random number chosen by the client, used by the client and server to associate messages and responses between a client and a server. |
| SECS 120 | Filled in by client, seconds elapsed since client started trying to boot. |
| FLAGS 122 | Flags including a BROADCAST bit. |
| CIADDR 124 | Client IP address; filled in by client in DHCPREQUEST if verifying previously allocated configuration parameters. |
| YIADDR 126 | 'Your'(client) IP address. |
| SIADDR 128 | IP 54 address of next server to use in bootstrap; returned in DHCPOFFER, DHCPACK and DHCPNAK by server. |
| GIADDR 130 | Gateway relay agent IP 54 address, used in booting via a relay-agent. |
| CHADOR 132 | Client hardware address (e.g., MAC layer 44 address). |
| SNAME 134 | Optional server host name, null terminated string. |
| FILE 136 | Boot file name, terminated by a null string. |
| OPTIONS 138 | Optional parameters. |

The DHCP 66 message structure shown in FIG. 5 is used to discover IP 54 network host interfaces in data-over-cable system 10. A network host client (e.g., the CM 16 or the CPE 18) uses the DHCP 66 to dynamically acquire or verify an IP 54 address and network parameters whenever the network parameters may have changed. Table 4b illustrates a typical use of the DHCP 66 protocol to discover a network address from a network host client like the CM 16 or the CPE 18.

TABLE 4b

1. A network host client broadcasts a DHCPDISCOVER message on its local physical subnet. The DHCPDISCOVER message may include options that suggest values for a network host interface address. BOOTP relay agents may pass the message on to DHCP 66 servers not on the same physical subnet.
2. DHCP servers may respond with a DHCPOFFER message that includes an available network address in the 'yiaddr' field (and other configuration parameters in DHCP 66 options) from a network host interface. DHCP 66 servers unicasts the DHCPOFFER message to the network host client (using the DHCP/BOOTP relay agent if necessary) if possible, or may broadcast the message to a broadcast address (preferably 255.255.255.255) on the client's subnet.
3. The network host client receives one or more DHCPOFFER messages from one or more DHCP 66 servers. The network host client may choose to wait for multiple responses.
4. The network host client chooses one DHCP 66 server with an associated network host interface from which to request configuration parameters, based on the configuration parameters offered in the DHCPOFFER messages.
5. The network host client sends a DCHPREQUEST message to the selected DHCP 66 server to request one available network address and configuration parameters from a selected DHCP 66 server.
6. The selected DHCP 66 server responds to the network host client with a DHCPACK message indicating acknowledgment of the use of the available network address and configuration parameters.

The DHCP 66 discovery process for the CM 16 and the CPE 18 in a data-over-cable system 10 differs when telephony return is used because of the upstream telephony return path and TRAC 24 connection to the CMTS 12 from the CM 16 and/or CPE 18. The DHCP 66 discovery process for a data-over-cable system with telephony return is described in co-pending application Ser. Nos. 09/018,784, 09/018,401 and 09/018,814.

Connection Services in a Data-over-cable System

During initialization, individual cable modems 16 may request upstream and downstream connections with a different Class-of-Service ("CoS") or Quality of Service ("QoS") to/from the CMTS 12 on the cable network 14. As is known in the art, CoS provides a reliable (i.e., error free, in sequence, with no loss of duplication) transport facility independent of the QoS. QoS collectively specifies the performance of the network service that a device expects on a network. The CoS and QoS connections are requested with a registration message sent from CM 16 to CMTS 12. Exemplary methods for providing CoS and QoS in a data-over-cable system in via the data-link layer 42 are described in co-pending application Ser. Nos. 09/079,323 and 09/079,322, which are both incorporated herein by reference. However, the present invention is not limited to these methods for providing CoS or QoS in the data-link layer 42 and other methods and other layers can also be used for providing CoS or QoS on a data-over-cable system.

Exemplary Data-over-cable System with Service Level Agreements

Figure 6:
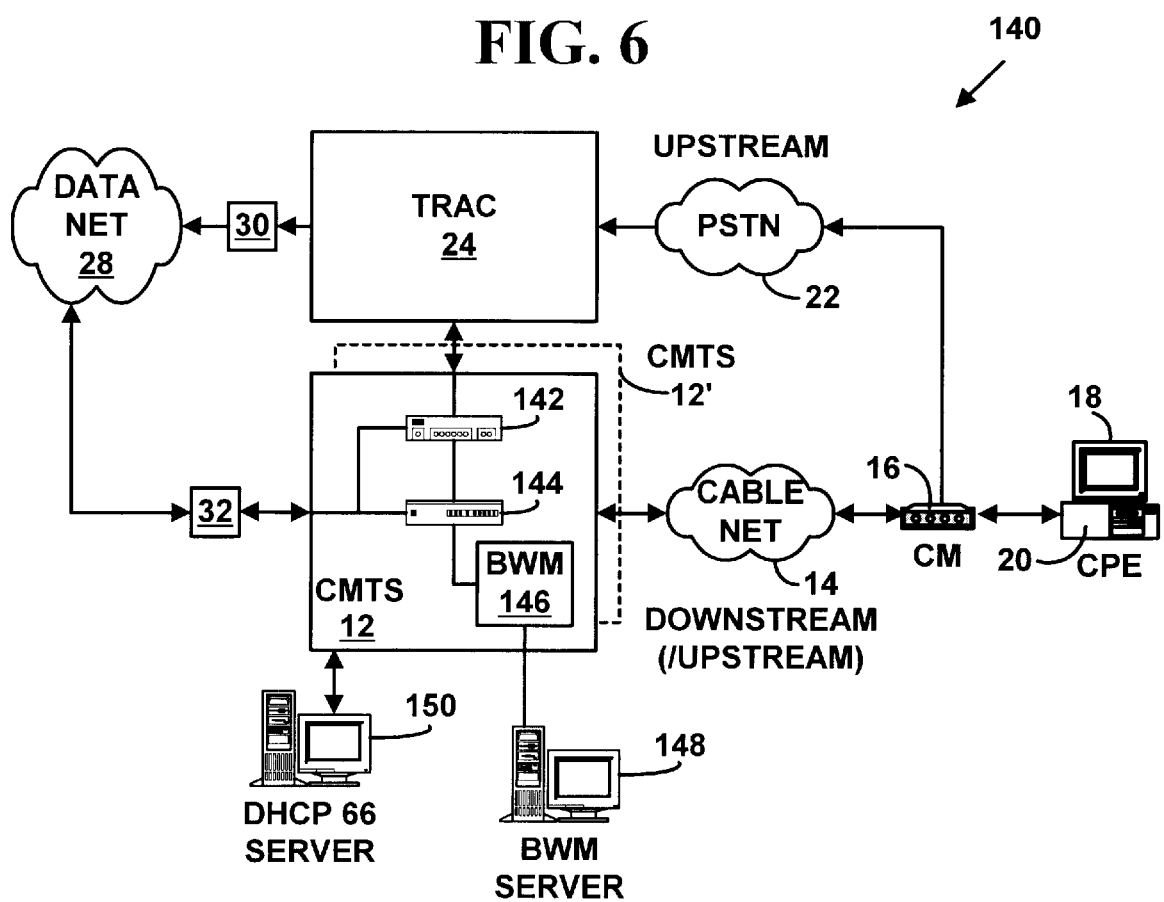
FIG. 6 is a block diagram illustrating an exemplary cable bandwidth provision system.

In one exemplary preferred embodiment of the present invention, CoS and QoS are preferably provided in a two-way data-over-cable system using service level agreements as is illustrated in FIG. 6. However, the present invention may also be used in a data-over-cable system with telephony return. FIG. 6 is a block diagram illustrating an exemplary data-over-cable system 140 for using service level agreements. The exemplary data-over-cable system 140 includes a CMTS 12, with a switch 142, a cable access router 144, a bandwidth manager 146, a bandwidth provisioning server 148 and a DHCP 66 server 150. However, more or fewer system components can also be used and the present invention is not limited to the components illustrated in FIG. 6.

In one exemplary preferred embodiment of the present invention, the switch 142, the cable access router 144 and the bandwidth manager 146 are integral to CMTS 12. In such an embodiment the CMTS 12 with integral components acts as a bridging device that enforces CoS and QoS, between the cable network 14 and external networks such as the data network 28 and the PSTN 22. The switch 142, cable access router 144 and the bandwidth manager 146 components are included as additional printed circuit boards in a Total Control hub with a cable modem termination unit by 3Com Corporation of Santa Clara, Calif. However, the integral CMTS 12 could also be another network server including those by Lucent Technologies of Murray Hill, N.J., Livingston Enterprises, Inc. of Plesanton, Calif., Ascend Communications of Alameda, Calif., Cisco Systems, Inc., of San Jose, Calif., and others. The switch 142, cable access router 144, and/or bandwidth manager 146, can also be used as separate, non-integral components associated with the CMTS 12.

In one preferred embodiment of the present invention, the CMTS 12 with integral components including the switch 142, the cable access router 144, and the bandwidth manager 146 is duplicated to provide a "hot" back-up in case of failure. A first CMTS 12 and second CMTS' 12 are on-line simultaneously and operate in parallel with only one in control and the other one in hot standby. The two units communicate with one another using a "keep-alive" signal.

If the primary CMTS 12 fails, the redundant unit CMTS' 12 immediately takes over, ideally without loss of any service. The units are made redundant by duplication of control messaging and a monitor that determines if/when a switchover between the active and stand-by units is necessary.

In another embodiment of the present invention, the redundant units are operated in a serial manner. In such an embodiment, the two units are cross-connected with a heartbeat controlled shunt on Ethernet ports. The serial mode is "active-active" as opposed to the parallel mode which is "active-standby."

In another embodiment of the present invention, any of the integral components in the CMTS 12 may be duplicated to provide a hot back-up in case of failure. In such an embodiment, the individual integral components instead after whole CMTS 12 are duplicated.

Thus, the CMTS 12 with integral components is a redundant "bridge" that enforces CoS and QoS, between the cable network 14 and external networks without adversely affecting system performance of throughput. The redundant CMTS 12 with internal components helps provide reliable CoS and QoS and reduces the risks of using a single network device to provide CoS and QoS service. The CMTS 12 with integral components also provides access routing for any of Asynchronous Transfer Mode ("ATM"), Asymmetric Digital Subscriber Lines ("ADSL"), Voice over Internet Protocol ("VoIP"), IP 54, etc. or cable data television streams to CMs 16 and CPEs 18 on the cable network 14.

In one preferred embodiment of the present invention, the switch 142 is a telephony or data switch capable of switching voice, video and/or data streams from the TRAC 24 and the data network 28 to the CMTS 12. The switch 142 is any of those provided by 3Com, Lucent, Livingston, Ascend, Cisco, or others. The cable access router 142 is a router that can enforce a Maximum Rate Limit ("MRL") on both downstream and upstream traffic to/from the CMTS 12. The cable access outer 142 is any of those provided by 3Com, Cisco and others.

The bandwidth manager 146 provides CoS and QoS services with policy management via the CMTS 12. The bandwidth manager 146 detects network trends, measures network response time and generates CoS and QoS reports. These network response measurements allow performance measurements and the taking of appropriate bandwidth actions to set acceptability standards for average peak cable network usage and cable link utilization.

The bandwidth provisioning server 148 provides a Graphical User Interface ("GUI") for bandwidth manager 146 administration, user set up, bandwidth usage monitoring, usage data collection, etc. The DHCP 66 server 150 dynamically assigns IP 54 addresses to the CMs 16 and CPEs 18.

Providing Service Level Agreements

FIG. 7 is a flow diagram illustrating a Method 152 for providing bandwidth provisioning. At Step 154, one or more Service Level Agreements ("SLAs") are created. As is known in the art SLAs are used to determine what policies, programs and/or data transmission rates will be offered to customers. The one or more service level agreements include one or more class-of-service or quality-of-service parameters for a desired class-of-service or quality-of-service. At Step 156, one or more pools of network addresses are assigned to the one or more service level agreements. At Step 158, a bandwidth manager associated with a cable modem termination system is notified of the one or more service level agreements and the one or more pools of network addresses. At Step 160, the one or more pools of network addresses are assigned to a network address server. The network address server assigns network addresses from the one or more pools to network devices requesting desired service level agreements on the data-over-cable system. At Step 162, one or more configuration files for the one or more service level agreements are created. The one or more configuration files are used to initialize a network device with a desired service level agreement on the data-over-cable system. At Step 164, data transmission information from the configuration files are loaded in a cable access router. The cable access router uses the data transmission information to enforce CoS or QoS parameters bandwidth parameters to enforce maximum rate limits for a desired service level agreement.

In one exemplary preferred embodiment of the present invention, Method 152 is used on the exemplary data-over-cable system 140. However, the present invention is not limited to this implementation, and other data-over-cable systems can also be used. In such an embodiment, at Step 154, one or more service level agreements are created. The one or more service level agreements include one or more class-of-service or quality-of-service parameters for a desired class-of-service or quality-of-service.

Table 5 illustrates exemplary service level agreements. However, the present invention is not limited to the service level agreements illustrated in Table 5 and other service level agreements can also be used.

TABLE 5

| Plan | CIR Down | MBR Down | CIR Up | MBR Up | Priority | Time |
|---|---|---|---|---|---|---|
| Biz Gold | 1024K | 1544K | 512K | 512K | 1 | M–F 8–6 |
| Biz Silver | 512K | 800K | 256K | 256K | 2 | M–F 8–6 |
| Gold | 256K | 512K | 128K | 128K | 3 | ALL |
| Silver | 128K | 256K | 64K | 64K | 4 | ALL |
| Premium | 64K | 128K | 40K | 40K | 5 | ALL |

In Table 5, "plan" refers to a service level agreement name, "CIR" indicates a guaranteed Committed Information Rate, "MBR" indicates a Maximum Burst Rate, "priority" indicates a priority assigned to the service level agreement (e.g., 1=highest priority, 5=lowest priority) and "time" indicates a time of day the service level agreement is available.

Table 6 illustrates two exemplary CoS service classes (class 1 and class 5) used in service level agreements Biz Gold and Premium (Table 5) respectively. However, more or fewer classes of service along with other identifying values could also be used. CoS service classes 2, 3 and 4 include similar parameters. CoS parameters include maximum downstream data rates in bits-per-second ("bps"), maximum upstream data rate in bps, upstream channel priority, guaranteed minimum data rates in bps, guaranteed maximum data rate in bps and other parameters. Table 6 illustrates CoS values as a value sub-Type, Length Value for a TLV format. However, other layouts and format can also be used.

TABLE 6

| Type | Length | Value (sub)type | Length | Value | Description of Value |
|---|---|---|---|---|---|
| 4 | 28 | 1 | 1 | 5 | CoS-5 |
| 4 | 28 | 2 | 4 | 128,000 | Maximum forward rate of 128K bps |

TABLE 6-continued

| Type | Length | Value (sub)type | Length | Value | Description of Value |
|---|---|---|---|---|---|
| 4 | 28 | 3 | 4 | 40,000 | Maximum return rate of 40K bps |
| 4 | 28 | 4 | 1 | 5 | Priority of 5 |
| 4 | 28 | 5 | 4 | 64,000 | Minimum guaranteed rate of 64 kbps |
| 4 | 28 | 6 | 2 | 10 | Maximum transmission burst of 10 cable network mini-slots |
| 4 | 28 | 1 | 1 | 1 | CoS-1 |
| 4 | 28 | 2 | 4 | 1,544,000 | Maximum forward rate of 1544K bps |
| 4 | 28 | 3 | 4 | 512,000 | Maximum return rate of 517K bps |
| 4 | 28 | 4 | 1 | 1 | Priority of 1 |
| 4 | 28 | 5 | 4 | 1,024,000 | Minimum guaranteed rate of 1024K bps |
| 4 | 28 | 6 | 2 | 100 | Maximum transmission burst of 100 cable network mini-slots |

QoS parameters include transit delay expected to deliver data to a specific destination, the level of protection from unauthorized monitoring or modification of data, cost for delivery of data, expected residual error probability, the relative priority associated with the data and other parameters.

Table 7 illustrates exemplary QoS parameters as Flow Identifiers in TLV format. However, more or fewer flow identifiers can also be used.

TABLE 7

| Type/Subtype | Length | Description of Value |
|---|---|---|
| Ax | N | Flow Class Definition Header |
| A0 | 4 | Flow Class Identifier |
| A1 | 1 | Flow Type |
| A2 | 1 | Ethernet precedence and TOS |
| A3 | 1 | ATM flow subtype |
| A4 | 6 | Minimum number of bytes/sec |
| A5 | 6 | Maximum number of bytes/sec |
| A6 | N | Cell Error Ratio |
| A7 | N | Cell Loss Ratio |
| A8 | N | Cell Mis-insertion Rate |
| A9 | N | Mean Cell Transfer Delay |
| A10 | N | Cell Variation Delay |
| A11–A127 | N | Reserved |
| A128–A255 | N | Vendor Specific |

Table 8 illustrates exemplary Type-Of-Service ("ToS") sub-TLV information for QoS parameters. However, more or fewer ToS parameters can also be used.

TABLE 8

| Type of Service (TOS) | Bit-0 | Bit-1 | Bit-2 | Bit-3 | Decimal Value |
|---|---|---|---|---|---|
| Maximize Delay | 1 | 0 | 0 | 0 | 1 |
| Maximize Throughput | 0 | 1 | 0 | 0 | 2 |
| Maximize Reliability | 0 | 0 | 1 | 0 | 4 |
| Minimize Cost | 0 | 0 | 0 | 1 | 8 |
| Normal Service | 0 | 0 | 0 | 0 | 0 |

Table 9 illustrates exemplary Flow Identifier Values (Type A0, Table 7). However, more or fewer flow identifier values can also be used.

TABLE 9

| Flow Identifier Value (4-bytes) | Definition of Value |
|---|---|
| 0 | The packet is to be sent to the network without any special treatment. |
| 1 | The packet is to be sent to the network using a precedence (i.e., priority) and TOS. |
| 2 . . . 255 | Reserved. |

Table 10 illustrates exemplary Flow type (Type A1, Table 7). However, more or fewer flow types can also be used.

TABLE 10

| Flow type | Definition |
|---|---|
| 1 | IP 54 |
| 2 | ATM |
| 3 . . . 255 | Reserved |

Table 11 illustrates exemplary ATM Flow sub-type (Type A3, Table 7). However, more or fewer ATM flow sub-types can also be used.

TABLE 11

| ATM Flow Sub-type | Definition |
|---|---|
| 1 | Universal Bit Rate ("UBR") |
| 2 | Constant Bit Rate ("CBR") |
| 3 | Adaptable Bit Rate ("ABR") |
| 4 | Variable Bit Rate ("VBR") |

In one exemplary preferred embodiment of the present invention, the CM 16 adds MAC 44 level Service IDentifiers ("SIDs") requests to a registration message sent to the CMTS 12 to request CoS or QoS. These SIDs provide device identification, QoS and CoS management. In particular, they are integral to bandwidth identification. A SID defines a particular mapping between the CM 16 and the CMTS 12. In one exemplary preferred embodiment of the present invention, this mapping is the basis on which bandwidth is allocated to the CM 16 by the CMTS 12 and which CoS and QoS are implemented. Within the MAC 44, SIDs are unique and the CMTS 12 may assign one or more SIDs to each CM 16, corresponding to the CoS or QoS required by a CM 16. Table 12 illustrates exemplary MAC 44 SID parameters in TLV format. However, more or fewer SID parameters can also be used. In addition SIDs may be used in other layers beside the data-link layer 42 for bandwidth identification (e.g., the network layer 52 or the transport layer 58, etc.).

TABLE 12

| Type/Subtype | Length | Description of Value | Default Value |
|---|---|---|---|
| Bx | N | Service Identifier Header | |
| B0 | 1 | Service Identifier Type | 0 |
| B1 | 1 | Number of Service Identifier's (SIDs) to be given with this definition | 1 |
| B2 | 4 | Flow Identifier for SIDs | 0 |
| B3 | 4 | CoS for SIDs | 0 |
| B4 | 4 | Source IP 54 address | CM's IP 54 address |
| B5 | 4 | Source IP 54 address mask | 255.255.255.255 |
| B6 | 4 | Destination IP 54 address | 255.255.255.255 |
| B7 | 4 | Destination IP 54 address mask | 255.255.255.255 |
| B8 | 1 | IP Protocol Type | 256 |
| B9 | 4 | Source Port (Start) | 0 |
| B10 | 4 | Source Port (End) | 65,535 |
| B11 | 4 | Destination Port (Start) | 0 |
| B12 | 4 | Destination Port (End) | 65,535 |
| B13 | 1 | Precedence and TOS | 0 |
| B14 | 1 | Precedence and TOS Mask | 255 |
| B15 | N | Multicast group definition | Null string"" |
| B16 | 4 | Protocol Type | 0xffffffff |
| B17–B127 | N | Reserved | |
| B128–B255 | N | Vendor Specific | |

Table 13 illustrates exemplary multicast and unicast Service Identifier Type values (Type B0, Table 12). However, more or fewer service identifier types can also be used.

TABLE 13

| Service Identifier Type Value | Value Definition |
|---|---|
| 1 | Outgoing unicast from CM 16 |
| 2 | Outgoing multicast from CM 16 |
| 3 | Incoming unicast to CM 16 |
| 8 | Outgoing multicast to CM 16 |

Table 14 illustrates exemplary IP Protocol Type values (Type B8, Table 12). However, more or fewer IP protocol types can also be used.

TABLE 14

| IP Protocol Type Value | Value Definition |
|---|---|
| 1 | ICMP 56 |
| 2 | Transmission Control Protocol ("TCP") |
| 4 | UDP 60 |
| 256 | Any Protocol |

Table 15 illustrates exemplary Protocol Type values (Type B16, Table 12). However, more or fewer protocol types can also be used.

TABLE 15

| Protocol Type Value | Value Definition |
|---|---|
| 0 | No Protocols Allowed |
| 1 | IP 54 |
| 2 | Internet Packet exchange ("IPX") |

TABLE 15-continued

| Protocol Type Value | Value Definition |
|---|---|
| 4 | Appletalk |
| 8 | ATM |
| 0xffffffff | All protocols allowed |

Table 16 illustrates an exemplary parameter for a number of CPEs 18 that can connect to a CM 16 during a session. However, more or fewer number of CPEs can also be used.

TABLE 16

| Type | Length | Description of Value | Default |
|---|---|---|---|
| H | 2 | Number of CPEs 18 that can connect to CM 16 during a session | 1 = CPE 18 or 0xffffffff = any number of CPEs 18 |

Returning to FIG. 7 at Step 156, one or more pools of IP 54 addresses are specified for the one or more service level agreements. Table 17 illustrates exemplary pools of IP 54 addresses specified for the one or more service level agreements shown in Table 5. However, the present invention is not limited to this exemplary pool of IP 54 addresses.

TABLE 17

| Plan | IP 54 Pool |
|---|---|
| Biz Gold | 24.4.56.1–24.4.56.255 |
| Biz Silver | 24.4.32.1–24.4.32.127 |
| Gold | 24.4.36.1–24.4.36.127 |
| Silver | 24.4.53.1–24.4.53.127 |
| Premium | 24.4.26.1–24.4.26.127 |

At Step 158, the bandwidth manager 146 (FIG. 6) is notified of the one or more service level agreements and one or more pools of IP 54 addresses. In one exemplary preferred embodiment of the present invention, the bandwidth manager 146 will also preferably include a cable modem traffic management service level agreement and a bandwidth manager 146 pool of IP 54 addresses. The bandwidth manager 146 pool includes IP 54 addresses that can be assigned to the CMs 16 by the DHCP server 150 for maintenance or other purposes. This insures that the CM management traffic service level agreement, including things as software upgrades, maintenance messages, emergency messages, and other messages, gets the appropriate priority and is not starved by higher priority service level agreements in the bandwidth manager 146.

Table 17 illustrates an exemplary cable modem management service level agreement. However, other service level agreements can also be used and the present invention is not limited to the service level agreement in Table 18.

TABLE 18

| Plan | CIR Down | MBR Down | CIR Up | MBR Up | Priority | Time |
|---|---|---|---|---|---|---|
| CM Mgmt | 512K | 1024K | 256K | 256K | 1 | ALL |

Table 19 illustrates an exemplary cable modem management IP 54 address pool of the cable modem management service level agreement of Table 18. However, the present invention is not limited to this pool of IP addresses.

TABLE 19

| Plan | IP 54 Pool |
| --- | --- |
| CM Mgmt | 20.3.53.0, 20.3.54.0 |

At Step 160, the one or more pools of Internet Protocol addresses (e.g., Tables 17 and 19) are assigned to the DHCP 66 server 150. The DHCP 66 server 150 assigns IP 54 addresses from the one or more pools for network devices requesting desired service level agreements on the bandwidth provisioning data-over-cable system 140. In one exemplary preferred embodiment of the present invention, the one or more service level agreements are assigned an IP 54 address from IP 54 address pools associated with in the DHCP 66 server 150.

At Step 162, one or more configuration files for the one or more service level agreements are created. The one or more configuration files are used to initialize a CM 16 or CPE 18 network device with desired service level agreement parameters on the data-over-cable system 140. In one exemplary preferred embodiment of the present invention, the configuration files are created using the DOCSIS standard. Such DOCSIS configuration files also include CoS and Requesting a Service Level Agreement In one exemplary preferred embodiment of the present invention, the data-over-over-cable 140 and Method 152 are used to provide bandwidth provisioning for CoS and QoS requests from CMs 16 and CPEs 18. FIG. 8 is a flow diagram illustrating a Method 166 for requesting service level agreements.

In FIG. 8 at Step 168, a network device requests a service level agreement with a desired class-of-service or quality-of-service from a cable modem termination system. At Step 170, the network device provides a data-link layer address on the data-over-cable system to the cable modem termination system to identify the network device. At Step 172, a network address is statically reserved for the network device on the data-over-cable system from the cable modem termination system. The statically reserved network address is from a pool of network addresses associated with the requested service level agreement. At Step 174, a network address is dynamically requested on the network device during a boot sequence. A network address server associated with the cable modem termination system allocates the reserved network address to the network device from the pool of network addresses associated with the requested service level agreement. At Step 176, the statically reserved network address is received on the network device in response to the dynamic request for a network address. At Step 178, a configuration file is received on the network device in response to the boot sequence. The configuration file is used to initialize a network device with configuration parameters and a desired service level agreement on the data-over-cable system. The configuration file includes default initialization parameters as well as service level agreement parameters. At Step 180, the configuration file is used to initialize the network device. Loading the configuration file on a network device QoS parameters in DOCSIS TLV format (e.g., examples illustrated in Tables 6–15). The configuration files also include default configuration parameters used to initialize a CM 16 or CPE 18 whether or not service level agreements are not used.

In one exemplary preferred embodiment of the present invention, the configuration files specify at least a Maximum Rate Limit ("MRL") for both a downstream and an upstream connection based on a respective CoS policy for a service level agreement. In one preferred embodiment of the present invention, the CMTS 12 to CM 16 or CPE 18, CoS capability is limited to enforcement of maximum bit rates. Since upstream CoS policy enforcement also depends on this downstream rate limitation interaction, the same bandwidth rate is used for upstream CIR and MBR. However, in another preferred embodiment of the present invention, the CoS policy enforcement is not limited only to enforcement of MBR and a separate list of upstream and downstream limits can also be enforced. Table 20 illustrates a list of exemplary configuration files created at Step 160.

TABLE 20

| Plan | Config File Name | MRL Down | MRL Up |
| --- | --- | --- | --- |
| Biz Gold | BizGold.conf | 1544K | 512K |
| Biz Silver | BixSilver.conf | 800K | 256K |
| Gold | Gold.conf | 512K | 128K |
| Silver | Silver.conf | 256K | 64K |
| Premium | Premium.conf | 128K | 40K |

At Step 164, the MRL and other CoS or QoS bandwidth information from the configuration files is loaded in the cable access router 144. The cable access router 144 uses the CoS or QoS information to enforce the MRLs for a desired service level agreement between the CMTS 12 and CMs 16 or CPEs 18. includes setting one or more parameters for class-of-service or quality-of-service for the desired service level agreement.

In one exemplary preferred embodiment of the present invention, Method 166 is used on exemplary data-over-cable system 140 to request service level agreements. However, the present invention is not limited to this implementation, and other data-over-cable systems can also be used. In such an embodiment, at Step 168 a CM 16 and/or CPE 18 requests a service level agreement with a desired class-of-service or quality-of-service from CMTS 12. At Step 170, the CM 16 and/or CPE 18 provides a MAC 44 address to the CMTS 12 to identify the network device.

In one exemplary preferred embodiment of the present invention, the MAC 44 address is sent to the CM 16 or CPE 18 in a TSI message 76 (FIG. 4). However, other methods may also be used to dynamically or statically assign a MAC 44 address.

At Step 172, an IP 54 address is statically reserved for the CM 16 and/or the CPE 18 using a static DHCP 66 reservation. As is known in the art, a device can statically reserve an IP 54 address using DHCP 66, but can still receive the IP 54 address dynamically from a DHCP 66 server.

At Step 174, the statically reserved IP 54 address is dynamically requested on the CM 16 and/or CPE 18 during a boot sequence. A CM 16 is recognized by an addressing scope different from the CPE 18 using DHCP 66. A DHCP giaddr-field 130 (FIG. 5) is set with an IP 54 address for a CM 16 when a CPE 18 is requesting a statically reserved IP 54 address from a pool associated with a desired service level agreement. The DHCP giaddr-field 130 may also be set with an IP 54 address for a downstream cable channel from the CMTS 12 when a CM 16 is requesting a statically reserved IP 54 address. In one preferred embodiment of the present invention a "Request IP Address" option 50 in the DHCP 66 message options-field 138 (FIG. 5) is set to include the statically reserved IP 54 address. This DHCP option 50 allows a request for a specific IP 54 address (i.e., a statically reserved IP 54 address). Thus, CM 16 and/or CPE 18 will send a DCHPDISCOVER message as described above in Table 4b with the DHCP 66 options-field 138 including DHCP option 50. This option field includes the statically reserved IP 54 address from the pool of network addresses associated with the requested service level agreement. However, other options and other methods may also be used to request the statically reserved IP 54 address. The DHCP 66 server 150 associated with CMTS 12 dynamically allocates the statically reserved IP 54 address to the CM 16 and/or the CPE 18 from the pool of IP 54 addresses associated with the requested service level agreement.

At Step 176, the statically reserved IP 54 address is dynamically received on the CM 16 and/or the CPE 18 via DHCP 66 server 150 in response to the request for a dynamically assigned IP 54 address (i.e., a request with a DHCPDISCOVER message). In one exemplary preferred embodiment of the present invention, the statically reserved IP 54 address is received on the CM 16 and/or the CPE 18 in a DHCPOFFER message in a yiaddr-field 126 from the DHCP 66 server 150 including the pool of IP 54 addresses associated with the requested service level agreement (e.g., see Table 4b). The CM 16 and/or the CPE 18 responds with a DCHPREQUEST message including the statically reserved IP 54 address in the DHCP yiaddr-field 126.

Step 178, a configuration file (e.g., from Table 19) is received on the network device in response to the boot sequence. The name for the configuration file is returned in a DCHPACK message file-field 136 from the DCHP 66 server 150 to the CM 16 and/or CPE 18. The configuration file is used to initialize a network device with a desired service level agreement on the data-over-cable system.

At Step 180, the configuration file is used to initialize the CM 16 and/or the CPE 18. Loading the configuration file includes setting one or more of the parameters for class-of-service or quality-of-service for the desired service level agreement. The desired service level agreement is enforced from the bandwidth manager 148 associated with the CMTS 12.

Enforcing Bandwidth Provisioning for Service Level Agreements

FIG. 9 is a flow diagram illustrating a Method 182 for enforcing bandwidth provisioning for service level agreements. At Step 184, a data stream is received on a cable modem termination system on a data-over-cable system for a first network device on the data-over-cable system from an external network. At Step 186, a test is conducted to determine from the cable modem termination system whether the data stream is to be controlled by a service level agreement. If the data stream is to be controlled by a service level agreement, at Step 188 the data transmission of the data stream is regulated using one or more parameters from the service level agreement. The data stream is regulated as data is sent from the cable modem termination to the first network device and as data is sent from the first network device back to the cable modem termination system. The cable modem termination system enforces class-of-service or quality-of-service from the service level agreement on the data stream between external network and the data-over-cable system. If the data stream is not is to be controlled by a service level agreement, at Step 190 the data stream is not regulated by the cable modem termination system using a service level agreement.

In one exemplary preferred embodiment of the present invention, Method 180 is used on the exemplary data-over-cable system 140. However, the present invention is not limited to this implementation, and other data-over-cable systems can also be used. In such an embodiment at Step 184, a data stream is received on CTMS 12 on the data-over-cable system for the CM 16 or the CPE 18 on the data-over-cable system from an external network such as PSTN 22 data network 28, or another cable network. The data stream may include voice, video or data information. At Step 186, a test is conducted from the CMTS 12 to determine whether the data stream is to be controlled by a service level agreement.

If the data stream is to be controlled by a service level agreement, at Step 188 the data transmission of the data stream is regulated using one or more parameters from the service level agreement. The data stream is regulated as data is sent from the CMTS 12 to the CM 16 or CPE 18 and as data is sent from the CM 16 or CPE 18 to the CMTS 12. If the data stream is not is to be controlled by a service level agreement at Step 186, the data stream is not regulated with service level agreement by the CMTS 12 at Step 190.

Regulating data transmission of the data stream includes detecting data transmission trends, measuring data transmission response times and generating class-of-service or quality-of-service reports. In one exemplary preferred embodiment of the present invention, the desired service level agreement is enforced from the bandwidth manager 148 associated with the CMTS 12. The cable access router 144 associated with CMTS 12 also enforces MRLs for a desired service level agreement.

Adjusting Data Transmission for Service Level Agreements

In one preferred embodiment of the present invention the bandwidth manager 148 may also monitor, and regulate data transmission based on service level agreement requests. FIG. 10 is a flow diagram illustrating a Method 192 for monitoring and regulating data transmission using service level agreements.

In FIG. 10 at Step 194, a first data transmission rate is monitored from a data-link layer on a cable modem termination system on a connection to a first network device using a first service level agreement. In one exemplary preferred embodiment of the present invention, the cable modem termination system monitors the first data transmission rate from the data-link 42 layer using one or more class-of-service or quality-of-service parameters from the first service level agreement. In another embodiment of the present invention, the cable modem termination system monitors the first data transmission in a layer above the data-link layer 42 (e.g., the network layer 52, the transport layer 58, etc.). At Step 196, the first data transmission rate on the connection is regulated from the data-link layer on the cable modem termination system using messages from a data-link layer protocol.

The first data transmission rate can also be adjusted from the cable modem termination system. A request from the first network device is received on the data-link layer on the cable modem termination system to use a second service level agreement on the connection from the cable modem termination system to the first network device. The first data transmission rate is adjusted to a second data transmission rate on the cable connection from the data-link layer on the cable modem termination system. The second data transmission rate includes a first data stream part regulated from the data-link layer using the first service level agreement and a second data stream part regulated from the data-link layer using the second service level agreement.

In one exemplary preferred embodiment of the present invention, Method 192 is used on the exemplary data-over-cable system 140. However, the present invention is not limited to this implementation, and other data-over-cable systems can also be used. In such an embodiment at Step 194, a first data transmission rate is monitored from a data-link layer 42 on the bandwidth manger 146 associated with the CMTS 12 on cable connection to the CM 16 or CPE 18 using a first service level agreement. In one exemplary preferred embodiment of the present invention, the bandwidth manager 146 monitors the first data transmission rate from the data-link 42 layer using one or more class-of-service or quality-of-service parameters from the first service level agreement. In another embodiment of the present invention, the bandwidth manager 146 monitors the first data transmission in a layer above the data-link layer 42 (e.g., the network layer 52, the transport layer 58, etc.). In one exemplary preferred embodiment of the present invention at Step 196, the first data transmission rate on the cable connection is regulated from the data-link layer 42 by the bandwidth manager 146 using MAC 44 messages. In another exemplary preferred embodiment of the present invention, the bandwidth manager 146 uses messages from other protocols above the data-link layer 42 to regulate data transmission.

Shaping Data Traffic Using Service Level Agreements

In one preferred embodiment of the present invention, the bandwidth manager 146 associated with the CMTS 12 may also shape data traffic based on service level agreement requests. In one exemplary preferred embodiment of the present invention, the traffic shaping is conducted from the data-link layer 42. In another preferred embodiment of the present invention, the traffic shaping is conducted form a layer above the data-link layer 42.

FIG. 11 is a flow diagram illustrating a Method 200 for shaping data traffic using service level agreements. At Step 202, a first data transmission rate on a connection from a cable modem termination system to a first network device is regulated using a first service level agreement. The cable modem termination system regulates the first data transmission rate one or more class-of-service or quality-of-service parameters from the first service level agreement. At Step 204, a request is received from the first network device on the cable modem termination system to use a second service level agreement along with the first service level agreement on the connection from the cable modem termination system to the first network device. Use of the first service level agreement and the second service level agreement on the connection requires a second data transmission rate on the connection that will exceed a maximum data transmission rate available for the connection.

At Step 206, the first data transmission rate on the connection is adjusted dynamically to a third data transmission rate. The third data transmission rate includes a first data stream part regulated using a third service level agreement and a second data stream part regulated using the second service level agreement. The third service level agreement includes one or more class-of-service or quality-of-service parameters different from the first service level agreement. Regulating the third data transmission rate on the connection using the second service level agreement and the third service level agreement does not exceed the maximum data transmission rate available for the connection. The third service level agreement includes one or more class-of-service or quality-of-service parameters for a lesser service level for a lower data transmission rate than included the first service level agreement.

In one exemplary preferred embodiment of the present invention, Method 200 is used on the exemplary data-over-cable system 140. However, the present invention is not limited to this implementation, and other data-over-cable systems can also be used. In such an embodiment at Step 202, a first data transmission rate on a cable connection from the CMTS 12 to the CM 16 or the CPE 18 is regulated by the bandwidth manager 146 associated with the CMTS 12 using a first service level agreement (e.g., Biz Gold, Table 5). The bandwidth manager 146 regulates the first data transmission rate one or more class-of-service or quality-of-service parameters from the first service level agreement.

At Step 204, a request is received from the CM 16 or the CPE 18 on the bandwidth manager 146 associated with CMTS 12 to use a second service level agreement (e.g., $2^{nd}$ Biz Gold, Table 5) along with the first service level agreement ($1^{st}$ Biz Gold, Table 5) on the cable connection to the CM 16 or the CPE 18. Use of the first service level agreement and the second service level agreement on the connection requires a second data transmission rate on the cable connection that will exceed a maximum data transmission rate available for the cable connection.

In one embodiment of the present invention, the second service level agreement is the same as the first service level agreement (e.g., Two Biz Gold from Table 5). In another embodiment of the present invention, the second service level agreement is not the same as the first service level agreement (e.g., a Biz Gold and a Biz Silver, respectively from Table 5).

At Step 206, the first data transmission rate on the connection is adjusted dynamically by the bandwidth manager 146 to a third data transmission rate. The third data transmission rate includes a first data stream part regulated using a third service level agreement (e.g., Silver, Table 5) and a second data stream part regulated using the second service level agreement (e.g. $2^{nd}$ Biz Gold, Table 5). The third service level agreement includes one or more class-of-service or quality-of-service parameters different from the first service level agreement. Regulating the third data transmission rate on the connection using the second service level agreement and the third service level agreement does not exceed the maximum data transmission rate available for the connection. The third service level agreement includes one or more class-of-service or quality-of-service parameters for a lesser service level (e.g., Priority 4 instead of highest Priority 1) for a lower data transmission rate than included the first service level agreement (e.g., 256K MBR for Silver down instead of 1544K MBR down for $1^{st}$ Biz Gold).

In one exemplary preferred embodiment of the present invention, the third service level agreement may be dynamically adjusted to a "best-effort" service level agreement. Such a best-effort service level would be a lowest priority service level (e.g., priority 6) and would not guarantee any data at all. The bandwidth manager 146 would make a best effort to transmit data only after all the higher priority service level agreement data is transmitted.

The methods and system described herein may allow service level agreements to be used on a data-over-cable system without adversely affecting performance or throughput on the data-over-cable system. The methods and system of the present invention may also help provide service level agreements on a data-over-cable system in a more reliable manner.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used and visa-versa.

In view of the wide variety of embodiments to which the principles of the invention can be applied, it should be understood that the illustrative embodiments are exemplary only, and should not be taken as limiting the scope of the present invention. For example, the steps of the flow diagrams may be taken in sequences other than those described, and more or fewer elements or component may be used in the block diagrams.

The claims should not be read as limited to the described order or elements unless stated to that effect. Therefore, all embodiments that come within the scope and spirit of the following claims and equivalents thereto are claimed as the invention.

We claim:

1. In a data-over-cable system with a plurality of network devices, a method for requesting a service level agreement, the method comprising the steps of:

requesting on a network device, a service level agreement with a desired class-of-service or quality-of-service from a cable modem termination system;

providing a data-link layer address for the network device on the data-over-cable system to the cable modem termination system to identify the network device;

reserving statically a network address for the network device on the data-over-cable system from the cable modem termination system, wherein the statically reserved network address is reserved from a pool of network addresses associated with the requested service level agreement;

requesting dynamically a network address on the network device during a boot sequence, wherein a network address server associated with the cable modem termination system allocates the statically reserved network address to the network device from the pool of network addresses associated with the requested service level agreement;

receiving dynamically the statically reserved network address on the network device agreement in response to the dynamic request for a network address;

receiving a configuration file on the network device in response to the boot sequence, wherein the configuration file is used to initialize a network device with a desired service level agreement on the data-over-cable system; and initializing the network device with the configuration file, wherein loading the configuration file includes setting a plurality of parameters for class-of-service or quality-of-service for the desired service level agreement on the network device.

2. A computer readable medium having stored therein instructions for causing a central processing unit to execute the method of claim 1.

3. The method of claim 1 wherein the data-link layer address is a Medium Access Control protocol address and the network address is an Internet Protocol address.

4. The method of claim 1 wherein the network address server is a Dynamic Host Configuration Protocol server.

5. The method of claim 1 wherein step of loading the configuration file on the network device includes setting maximum transmission and reception rate limits from the configuration file on the network device to comply with a desired class-of-service or quality-of-service for the desired service level agreement.

6. The method of claim 1 further comprising:

operating the network device using the plurality of class-of-service or plurality-of-service parameters from the desired service level agreements; and enforcing the desired service level agreement from a bandwidth manager associated with the cable modem termination system on a connection between the cable modem termination system on a cable modem by regulating data transmission flow on the connection according to the service level agreement.

* * * * *

UNITED STATES PATENT AND TRADEMARK OFFICE
CERTIFICATE OF CORRECTION

PATENT NO.    : 6,553,568 B1
DATED         : April 22, 2003
INVENTOR(S)   : John G. Fijolek et al.

It is certified that error appears in the above-identified patent and that said Letters Patent is hereby corrected as shown below:

<u>Title page,</u>
Item [75], Inventors, please delete "Phillip T. Robinson" and substitute
-- Philip T. Robinson --; and please delete "Narij Jain" and substitute -- Niraj Jain --

Signed and Sealed this

Eighteenth Day of November, 2003

JAMES E. ROGAN
*Director of the United States Patent and Trademark Office*